United States Patent
Rapaka et al.

(10) Patent No.: US 9,681,145 B2
(45) Date of Patent: Jun. 13, 2017

(54) SYSTEMS AND METHODS FOR INTER-LAYER RPS DERIVATION BASED ON SUB-LAYER REFERENCE PREDICTION DEPENDENCY

(71) Applicant: QUALCOMM Incorporated, San Diego, CA (US)

(72) Inventors: Krishnakanth Rapaka, San Diego, CA (US); Ye-Kui Wang, San Diego, CA (US); Jianle Chen, San Diego, CA (US); Fnu Hendry, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 14/513,089

(22) Filed: Oct. 13, 2014

(65) Prior Publication Data

US 2015/0103904 A1  Apr. 16, 2015

Related U.S. Application Data

(60) Provisional application No. 61/890,759, filed on Oct. 14, 2013.

(51) Int. Cl.
*H04N 19/44* (2014.01)
*H04N 19/597* (2014.01)
(Continued)

(52) U.S. Cl.
CPC ............ *H04N 19/44* (2014.11); *H04N 19/30* (2014.11); *H04N 19/597* (2014.11); *H04N 19/70* (2014.11)

(58) Field of Classification Search
CPC ...... H04N 19/44; H04N 19/30; H04N 19/597; H04N 19/70
(Continued)

(56) References Cited

U.S. PATENT DOCUMENTS

2010/0158110 A1   6/2010 Pandit et al.
2013/0188881 A1   7/2013 Zhao et al.
(Continued)

FOREIGN PATENT DOCUMENTS

WO   WO-2014205067 A1   12/2014

OTHER PUBLICATIONS

Chen J., et al., "MV-HEVC/SHVC HLS: On Inter layer Prediction Signaling", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-E0084-v2, Jul. 29, 2013 (Jul. 29, 2013), pp. 1-5, XP030131088.
(Continued)

*Primary Examiner* — William C Vaughn, Jr.
*Assistant Examiner* — Jae N Noh
(74) *Attorney, Agent, or Firm* — Knobbe Martens Olson & Bear, LLP

(57) ABSTRACT

Systems and methods for inter-layer reference picture set derivation based on sub-layer reference prediction dependency are described herein. One aspect of the subject matter described in the disclosure provides a video encoder comprising a memory configured to store one or more direct reference layer pictures of one or more current pictures in a sequence, wherein the one or more current pictures are associated with a current layer, the current layer being associated with the one or more direct reference layers. The video encoder further comprises a processor in communication with the memory unit. The memory unit is configured to set an indication associated with a current picture to indicate whether all of the one or more direct reference layer pictures of the current picture that are not restricted for use in inter-layer prediction are included in an inter-layer reference picture set associated with the current picture.

12 Claims, 8 Drawing Sheets

(51) Int. Cl.
*H04N 19/70* (2014.01)
*H04N 19/30* (2014.01)

(58) Field of Classification Search
USPC .................................................. 375/240.12
See application file for complete search history.

(56) References Cited

U.S. PATENT DOCUMENTS

| | | |
|---|---|---|
| 2013/0208792 A1 | 8/2013 | He et al. |
| 2014/0140406 A1 | 5/2014 | Yu et al. |
| 2014/0192859 A1 | 7/2014 | Haque et al. |
| 2014/0301451 A1 | 10/2014 | Deshpande |
| 2014/0301452 A1 | 10/2014 | Deshpande |
| 2014/0301453 A1* | 10/2014 | Deshpande ............ H04N 19/50 375/240.12 |
| 2015/0010050 A1 | 1/2015 | Chen et al. |
| 2015/0010051 A1* | 1/2015 | Chen .................... H04N 19/105 375/240.02 |
| 2015/0334407 A1 | 11/2015 | Rusert |
| 2015/0350660 A1* | 12/2015 | Choi ..................... H04N 19/31 375/240.12 |
| 2015/0358641 A1 | 12/2015 | Choi et al. |
| 2016/0057439 A1* | 2/2016 | Yamamoto ............ H04N 19/51 375/240.12 |
| 2016/0134868 A1 | 5/2016 | He et al. |
| 2016/0261878 A1 | 9/2016 | Deshpande |

OTHER PUBLICATIONS

International Search Report and Written Opinion—PCT/US2014/060486—ISA/EPO—Jan. 22, 2015.
Rapaka K., et al., "MV-HEVC/SHVC HLS: On inter-layer RPS derivation and sub-layer inter-layer dependency", 6. JCT-3V Meeting; Oct. 25, 2013-Nov. 1, 2013; Geneva; (The Joint Collaborative Team on 3D Video Coding Extension Development of ISO/IEC JCT1/SC29/WG11 and ITU-T SG.16); URL: http://phenix.int-evry.fr/jct2/, No. JCT3V-F0080, Oct. 15, 2013 (Oct. 15, 2013), XP030131488, pp. 1-6.
Tech G., et al., "MV-HEVC Draft Text 5", Joint Collaborative Team on 3D Video Coding Extension Development of ITU-T SG 16 WP 3 and ISO/IEC JTC 1/SC 29/WG 11, Doc: JCT3V-E1004-v6, 5th Meeting: Vienna, AT, Jul. 27-Aug. 2, 2013, 65 pages.
Chen J., et al., "Scalable HEVC (SHVC) Working Draft 2", 104. MPEG Meeting; Apr. 22, 2013-Apr. 26, 2013; Incheon; (Motion Picture Expert Group or ISO/IEC JTC1/SC29/WG11), No. N13570, Jun. 25, 2013 (Jun. 25, 2013), pp. 1-65, XP030020318.
Chen J., et al., "SHVC Working Draft 2", Joint Collaborative Team on Video Coding (JCT-VC) of ITU-T SG16 WP3 and ISO/IEC JCT1/SC29/WG11 13th Meeting: Incheon, KR, Apr. 18-26, 2013, document No. JCTVC-M1008_v3, 67 pages.
Choi B., et al., "Parameter set design for redundancy removal", 13. JCT-VC Meeting; 104. MPEG Meeting; Apr. 18, 2013-Apr. 26, 2013; Incheon; (Joint Collaborative Team on Video Coding of ISO/IEC JCT1/SC29/WG11 and ITU-T SG.16); URL: http://wftp3.itu.int/av-arch/jctvc-site/,, No. JCTVC-M0165, Apr. 9, 2013 (Apr. 9, 2013), pp. 1-5, XP030114122.
Deshpande (Sharp) S., "On Implicit Signaling of Scalability Dimension Identifiers", 12. JCT-VC Meeting; 103. MPEG Meeting; Jan. 14, 2013-Jan. 23, 2013; Geneva; (Joint Collaborative Team on Video Coding of ISO/IEC JCT1/SC29/WG11 and ITU-T SG.16); URL: http://wftp3. itu. int/av-arch/jctvc-site/,, No. JCTVC-L0209, Jan. 8, 2013 (Jan. 8, 2013), XP030113697.

Deshpande (Sharp) S: "Comments on SHVC and MV-HEVC", 14. JCT-VC Meeting; Jul. 25, 2013-Aug. 2, 2013; Vienna; (Joint Collaborative Team on Video Coding of ISO/IEC JCT1/SC29/WG11 and ITU-T SG.16); URL: http://wftp3.itu.int/av-arch/jctvc-site/,, No. JCTVC-N0195, Jul. 16, 2013 (Jul. 16, 2013), XP030114688.
Deshpande (Sharp) S., "On Layer Dependency Signaling", 12. JCT-VC Meeting; 103. MPEG Meeting; Jan. 14, 2013-Jan. 23, 2013; Geneva; (Joint Collaborative Team on Video Coding of ISO/IEC JCT1/SC29/WG11 and ITU-T SG.16); URL: http://wftp3.itu.int/av-arch/jctvc-site/,,No. JCTVC-L0210, Jan. 8, 2013 (Jan. 8, 2013), pp. 1-8, XP030113698.
Hannuksela M M., et al., "JCT-3V AHG Report: 3D high level syntax (AHG7)", 4. JCT-3V Meeting; Apr. 20, 2013-Apr. 26, 2013; Geneva; (The Joint Collaborative Team on 3D Video Coding Extension Development of ISO/IEC JCT1/SC29/WG11 and ITU-T SG.16); URL: http://phenix.int-evry.fr/jct2/,, No. JCT3V-D0007, Apr. 28, 2013 (Apr. 20, 2013), pp. 1-2; XP030130681.
Hannuksela M M., et al., "JCT-VC AHG report: High-level syntax for HEVC extensions (AHG9)", 13. JCT-VC Meeting; 104. MPEG Meeting; Apr. 18, 2013-Apr. 26, 2013; Incheon; (Joint Collaborative Team on Video Coding of ISO/IEC JCT1/SC29/WG11 and ITU-T SG.16); URL: http://wftp3.itu.int/av-arch/jctvc-site/,, No. JCTVC-M0009, Apr. 17, 2013 (Apr. 17, 2013), pp. 1-5, XP030113972.
He Y., et al., "MV-HEVC/SHVC HLS: On SHVC High Level Syntax", 5. JCT-3V Meeting; Jul. 27, 2013-Aug. 2, 2013; Vienna; (The Joint Collaborative Team on 3D Video Coding Extension Development of ISO/IEC JCT1/SC29/WG11 and ITU-T SG.16): URL: http://phenix.int-evry.fr/jct2/,, No. JCT3V-E0097, Jul. 17, 2013 (Jul. 17, 2013), pp. 1-7, XP030131103.
Kang J W., et al., "MV-HEVC/SHVC HLS: On signaling of inter-layer RPS in slice segment header", 14. JCT-VC Meeting; Jul. 25, 2013-Aug. 2, 2013; Vienna; (Joint Collaborative Team on Video Coding of ISO/IEC JCT1/SC29/WG11 and ITU-T SG.16); URL: http://wftp3.itu.int/av-arch/jctvc-site/,, No. JCTVC-N0154, Jul. 15, 2013 (Jul. 15, 2013), pp. 1-3, XP030114627.
Rusert T., "On VPS extension design", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16 ); URL: http://wftp3.itu.int/av-arch/jctvc-site/,,No. JCTVC-L0138, Jan. 7, 2013 (Jan. 7, 2013), pp. 1-7, XP030113626.
Tech G., et al., "MV-HEVC Draft Text 4", Joint Collaborative Team on 3D Video Coding Extenstion Development of ITU-T SG 16 WP 3 and ISO/IEC JCT 1/SC 29/WG 11 4th Meeting: Incheon, KR, Apr. 20-26, 2013, document No. JCT3V-D1004-v4, 64 pages.
Tech G., et al., "Study Text of ISO/IEC 23008-2:201x/PDAM2 HEVC Multiview Extensions", 104. MPEG Meetings: Apr. 22, 2013-Apr. 26, 2013; Incheon; (Motion Picture Expert Group or ISO/IEC JTC1/SC29/WG11),, No. N13572, Jun. 19, 2013 (Jun. 19, 2013), pp. 1-62; XP030020320.
Wang Y-K et al., "AHG9: Signalling and derivation of inter-layer RPS for HEVC 3DV and scalable extensions", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-Site/,, No. JCTVC-M0269, Apr. 9, 2013 (Apr. 9, 2013), pp. 1-5, XP030114226.
Xu J., et al., "MV-HEVC/SHVC HLS: On inter-layer prediction related syntax", 14. JCT-VC Meeting; Jul. 25, 2013-Aug. 2, 2013; Vienna; (Joint Collaborative Team on Video Coding of ISO/IEC JCT1/SC29/WG11 and ITU-T SG.16); URL: http://wftp3.itu.int/av-arch/jctvc-site/,, No. JCTVC-N0081, Jul. 14, 2013 (Jul. 14, 2013), pp. 1-8, XP030114526.

* cited by examiner

SYSTEMS AND METHODS FOR INTER-LAYER RPS DERIVATION BASED ON SUB-LAYER REFERENCE PREDICTION DEPENDENCY

CROSS-REFERENCE TO RELATED APPLICATIONS

This application claims priority to U.S. Provisional Patent Application No. 61/890,759, entitled "IMPROVEMENTS TO INTER-LAYER RPS DERIVATION METHODS BASED ON SUB-LAYER REFERENCE PREDICTION DEPENDENCY IN HEVC EXTENSIONS," filed Oct. 14, 2013, the entirety of which is incorporated herein by reference.

TECHNICAL FIELD

This disclosure is related to the field of scalable video coding (SVC). More particularly, it is related to HEVC based SVC (HEVC-SVC) and HEVC extensions.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in various video coding standards as described below (e.g., High Efficiency Video Coding (HEVC)). The video devices may transmit, receive, encode, decode, and/or store digital video information more efficiently by implementing such video compression techniques.

SUMMARY

The systems, methods, and devices of this disclosure each have several innovative aspects, no single one of which is solely responsible for the desirable attributes disclosed herein. The details of one or more examples are set forth in the accompanying drawings and the description below. Other features, objects, and advantages will be apparent from the description and drawings, and from the claims.

One aspect of the subject matter described in the disclosure provides a video encoder comprising a memory configured to store one or more direct reference layer pictures of one or more current pictures in a sequence, wherein the one or more current pictures are associated with a current layer, the current layer being associated with the one or more direct reference layers. The video encoder further comprises a processor in communication with the memory unit. The memory unit is configured to set an indication associated with a current picture to indicate whether all of the one or more direct reference layer pictures of the current picture that are not restricted for use in inter-layer prediction are included in an inter-layer reference picture set associated with the current picture.

Another aspect of the subject matter described in the disclosure provides a method of encoding video. The method comprises storing one or more direct reference layer pictures of one or more current pictures in a sequence, wherein the one or more current pictures are associated with a current layer, the current layer being associated with the one or more direct reference layers. The method further comprises setting an indication associated with a current picture to indicate whether all of the one or more direct reference layer pictures of the current picture that are not restricted for use in inter-layer prediction are included in an inter-layer reference picture set associated with the current picture.

Another aspect of the subject matter described in the disclosure provides a video decoder comprising a memory unit. The memory unit is configured to store one or more direct reference layer pictures, wherein each of the one or more direct reference layer pictures is associated with a respective direct reference layer of one or more direct reference layers, wherein the one or more direct reference layers are associated with a current layer, and wherein the current layer is associated with a current picture. The video decoder further comprises a processor in communication with the memory. The processor is configured to determine, based on an indication, whether all of the one or more direct reference layer pictures that are not restricted for use in inter-layer prediction are included in an inter-layer reference picture set associated with the current picture.

Another aspect of the subject matter described in the disclosure provides a method for decoding video. The method comprises storing one or more direct reference layer pictures, wherein each of the one or more direct reference layer pictures is associated with a respective direct reference layer of one or more direct reference layers, wherein the one or more direct reference layers are associated with a current layer, and wherein the current layer is associated with a current picture. The method further comprises determining, based on an indication, whether all of the one or more direct reference layer pictures that are not restricted for use in inter-layer prediction are included in an inter-layer reference picture set associated with the current picture.

DETAILED DESCRIPTION

Figure 1A:
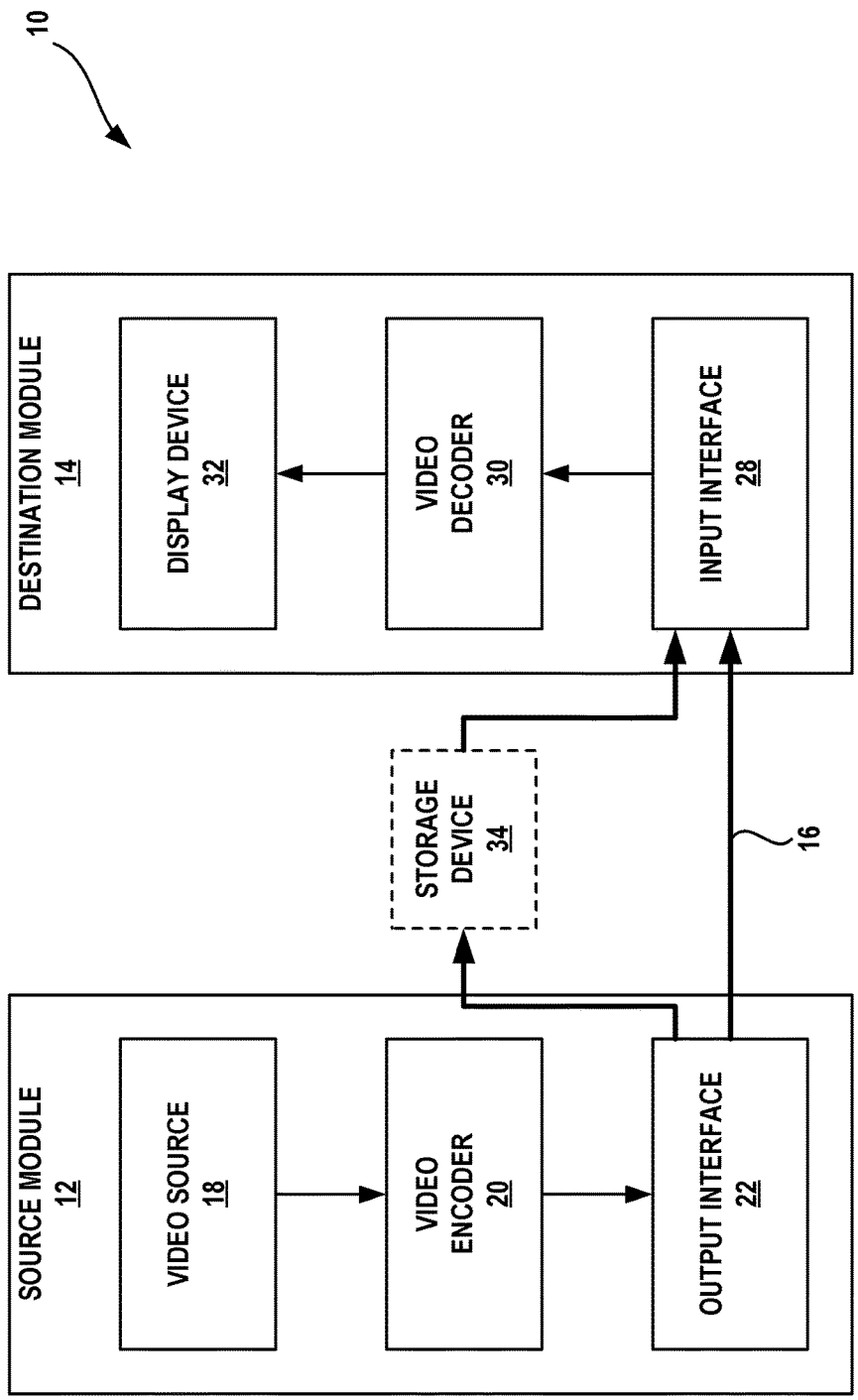
FIG. 1A is a block diagram illustrating an example video encoding and decoding system that may utilize the inter-layer reference picture set (RPS) derivation techniques described in this disclosure.

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Video coding standards include those defined by ITU-T H.261, ISO/IEC MPEG-1 Visual, ITU-T H.262 or ISO/IEC MPEG-2 Visual, ISO/IEC MPEG-4 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions, and Part 10, Advanced Video Coding (AVC), the High Efficiency Video Coding (HEVC) standard presently under development, and extensions of such standards. HEVC has recently been developed by the Joint Collaboration Team on Video Coding (JCT-VC) of ITU-T Video Coding Experts Group (VCEG) and ISO/IEC Motion Picture Experts Group (MPEG). The latest HEVC draft specification ("HEVC WD") is available from http://phenix.int-evey.fr/jct/doc_end user/documents/14_Vienna/wg11/JCTVC-N1003-v1.zip. The multi-view extension to HEVC (MV-HEVC) and an advanced HEVC 3D video coding extension (3D-HEVC) are being developed by the JCT-3V. Furthermore, the scalable video coding extension to HEVC (SHVC) is being developed by the JCT-VC. A recent Working Draft of MV-HEVC ("MV-HEVC WD5") is available from http://phenix.it-sudparis.eu/jct2/doc_end_user/documents/5_Vienna/wg11/JCT3V-E1004-v6.zip. The latest Working Draft of 3D-HEVC ("3D-HEVC WD1") is available from http://phenix.it-sudparis.eu/jct2/doc_end_user/documents/5_Vienna/wg11/JCT3V-E1001-v3.zip. Further, a recent Working Draft of SHVC ("SHVC WD3") is available from http://phenix.it-sudparis.eu/jct/doc_end_user/documents/14_Vienna/wg11/JCTVC-N1008-v3.zip.

As described above, certain aspects of video coding (e.g., in HEVC extensions) include deriving an inter-layer reference picture set for use in inter-layer prediction of current pictures in current layers. For example, a video encoder can analyze a number of reference pictures associated with a current picture in a current layer such that the video encoder can provide information usable by a video decoder that may allow the video decoder to derive the inter-layer reference picture set for the current picture and/or the current layer. For example, at the video parameter set (VPS) level, the video encoder can provide an indication (e.g., a syntax element and/or a flag set to a value of "0" or "1") that indicates to the video decoder that all of the pictures from a direct reference layer of the current layer may be used for (e.g., included within) a reference picture set (RPS). By providing certain indications (e.g., setting certain flags to a value of "0" or "1"), the video encoder may allow (or enable) the video decoder to determine how memory will be allocated for all of the pictures in the associated video sequence and may allow (or enable) the video decoder to insert each of the pictures into the reference picture set (RPS).

For example, recent Working Drafts of MV-HEVC WD5 and SHVC WD3 include the flag all_ref_layers_active_flag in the video parameter set (VPS) with the following semantics: "all_ref_layers_active_flag equal to 1 specifies that for each picture referring to the VPS, the reference layer pictures of all direct reference layers of the layer containing the picture are present in the same access unit as the picture and are included in the inter-layer reference picture set of the picture. all_ref_layers_active_flag equal to 0 specifies that the above restriction may or may not apply." When the video encoder sets the all_ref_layers_active_flag to a value of "1" and signals the all_ref_layers_active_flag to the video decoder, the video decoder can derive a variable specifying a number of inter-layer reference pictures included in the inter-layer reference picture set (RPS) for an associated picture (e.g., the video decoder can determine a number of active reference layer pictures). Recent Working Drafts of MV-HEVC WD5 and SHVC WD3 include the variable NumActiveRefLayerPics for this purpose. The code below shows how the variable NumActiveRefLayerPics is derived in recent Working Drafts of MV-HEVC WD5 and SHVC WD3:

```
if( nuh_layer_id = = 0 || NumDirectRefLayers[ nuh_layer_id ] = = 0 )
   NumActiveRefLayerPics = 0;
else if( all_ref_layers_active_flag )
   NumActiveRefLayerPics = NumDirectRefLayers[ nuh_layer_id ];
else if( !inter_layer_pred_enabled_flag )
   NumActiveRefLayerPics = 0;
else if( max_one_active_ref_layer_flag || NumDirectRefLayers[
nuh_layer_id ] = = 1 )
   NumActiveRefLayerPics = 1;
else
   NumActiveRefLayerPics = num_inter_layer_ref_pics_minus1 + 1;
```

By using all_ref_layers_active_flag in the above described manner, some slice-level signaling overhead can be saved during derivation of an inter-layer RPS. For example, signaling overhead can be saved when each of the direct reference layer pictures (sometimes referred to as reference layer pictures) of the current layer (the layer containing the current picture) are present in the same access unit as the current picture and are included in the inter-layer reference picture set of the current picture. A direct reference layer is a layer that may be used for inter-layer prediction of another layer, such as the current layer. A direct reference layer picture (or reference layer picture) is a picture in a direct reference layer which is used for inter-layer prediction of the current picture and is in the same access unit as the current picture. Such signaling overhead savings may occur in multi-view video coding scenarios when the direct reference layer pictures specified in the VPS are present in each access unit, the direct reference layer pictures specified in the VPS are all used for inter-layer prediction, and the direct reference layer pictures specified in the VPS are all inserted into at least one reference picture list of the current picture. Another scenario in which this may occur is during scalable video coding, where it is common for each enhancement layer to have only one direct reference layer and for the direct reference layer pictures to be present in each access unit and used for inter-layer prediction.

However, the current HEVC extension methods for signaling and RPS derivation described above have certain shortcomings. For example, the current process does not allow the video encoder to provide the video decoder with the signaling overhead saving indication as described above if any of the associated pictures in at least one sub-layer are restricted from use in inter-layer prediction. More specifically, recent Working Drafts of MV-HEVC WD5 and SHVC WD3 require that the all_ref_layers_active_flag be set to a value of zero (i.e., indicating that a restriction requiring that for each picture referring to the VPS, the reference layer pictures of all direct reference layers of the layer containing the picture are present in the same access unit as the picture and are included in the inter-layer reference picture set of the picture may or may not apply) when any of the associated pictures have a Temporal Identification Value (TID or TemporalID) greater than a maximum temporal identification value (Max TID), e.g., max_tid_ref_pics_plus1[i]. In other words, a temporal sub-layer inter-layer prediction restriction is indicated by max_tid_il_ref_pics_plus1[i]−1, for any value of i in the range of 0 to vps_max_layers_minus1, inclusive, less than or equal to the greatest value of TemporalId of all video coding layer (VCL) network abstraction layer (NAL) units in the coding video sequences (CVSs) referring to the VPS. These limitations may cause current approaches to waste coding resources (e.g., by having high memory costs, high signaling costs, etc.) and to diminish the utility of the above described flags and variables and/or diminish the utility of any other syntax elements that may otherwise be utilized for optimizing memory. In view of such limitations, it would be beneficial to allow a video encoder to provide a video decoder with the above described signaling overhead savings indications on a more frequent basis, for example, even if some of the associated pictures in at least one sub-layer are restricted from use in inter-layer prediction.

Thus, the present disclosure describes techniques for inter-layer reference picture set (RPS) derivation using indications and/or determinations related to certain properties of direct reference layer pictures to determine a number of active reference layer pictures from a set of direct reference layer pictures. In one aspect, the techniques described may comprise various methods for improving on existing inter-layer RPS derivation methods based on sub-layer reference prediction dependency. For example, the techniques may cause (or enable) a video encoder to provide a video decoder with signaling overhead savings indications more frequently than current methods. For example, the improved methods may be integrated in, for example, HEVC extensions, and applied to scalable coding, multi-view coding (e.g., with or without depth), and any other extension of HEVC and/or other multi-layer video codecs.

Any of the methods and/or signaling mechanisms described may be applied independently from each other or in combination.

Advantages of the techniques described in the present disclosure, among other advantages, may include reducing memory allocation and reducing signaling costs (e.g., index signaling costs) during the derivation of inter-layer reference picture sets. As compared to the current methods in MV-HEVC WD5 and SHVC WD3, the techniques described in the present disclosure may also reduce slice header bits for signaling of the inter-layer RPS during certain scenarios.

Figure 1B:
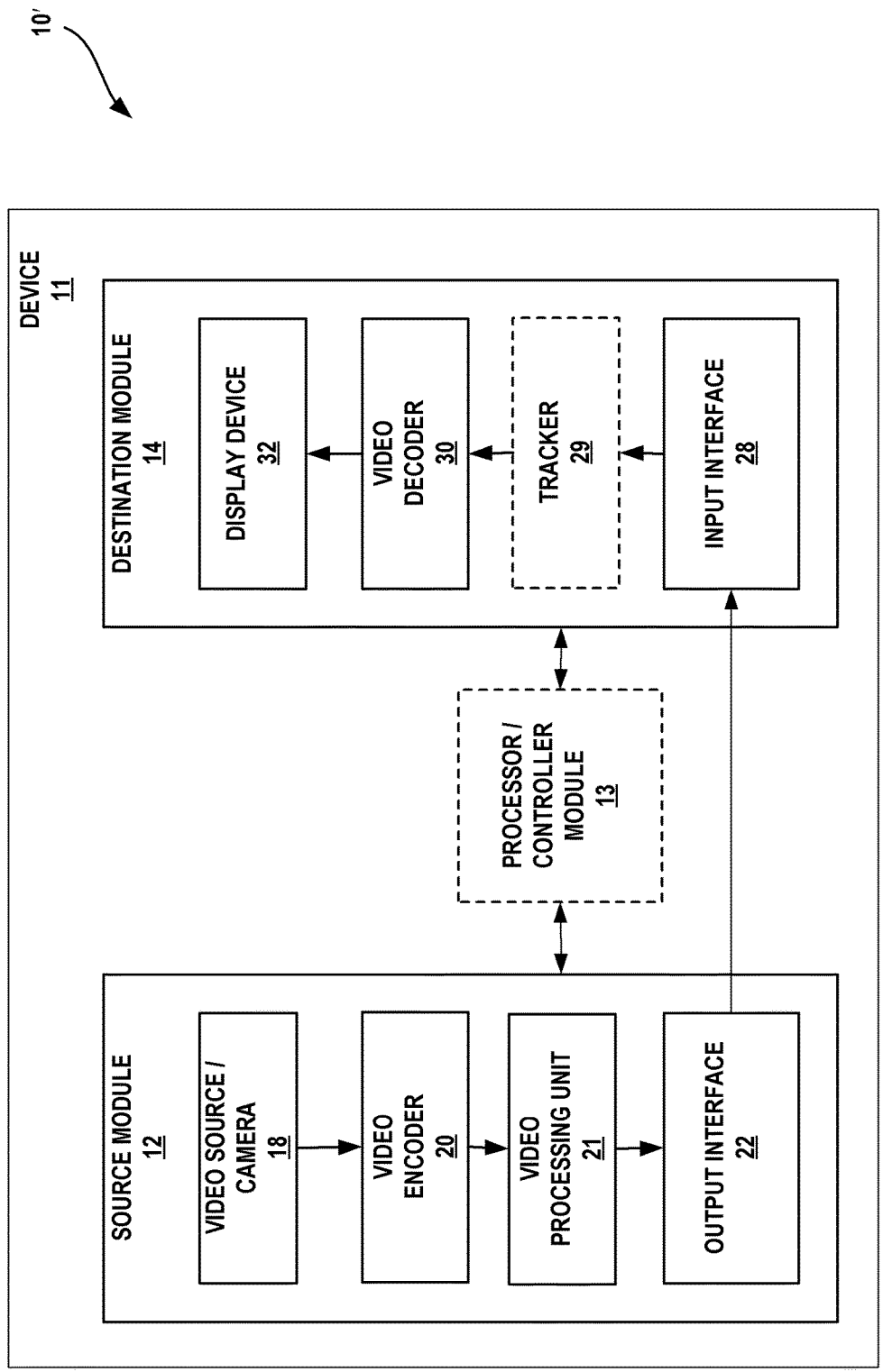
FIG. 1B is a block diagram illustrating another example video encoding and decoding system that may utilize the inter-layer reference picture set derivation techniques described in this disclosure.

FIG. 1A is a block diagram illustrating an example video encoding and decoding system 10 that may utilize the inter-layer reference picture set derivation techniques described in this disclosure. As shown in FIG. 1A, system 10 includes a source module 12 that generates encoded video data to be decoded at a later time by a destination module 14. In the example of FIG. 1A, the source module 12 and destination module 14 are on separate devices—specifically, the source module 12 is part of the source module, and the destination module 14 is part of a destination device. It is noted, however, that the source and destination modules 12, 14 may be on or part of the same device, as shown in the example of FIG. 1B.

With reference once again, to FIG. 1A, the source module 12 and the destination module 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source module 12 and the destination module 14 may be equipped for wireless communication.

The destination module 14 may receive the encoded video data to be decoded via a link 16. The link 16 may comprise any type of medium or device capable of moving the encoded video data from the source module 12 to the destination module 14. In the example of FIG. 1A, the link 16 may comprise a communication medium to enable the source module 12 to transmit encoded video data directly to the destination module 14 in real-time. The encoded video data may be modulated according to a communication standard, such as a wireless communication protocol, and transmitted to the destination module 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source module 12 to the destination module 14.

Alternatively, encoded data may be output from an output interface 22 to an optional storage device 31. Similarly, encoded data may be accessed from the storage device 31 by input interface. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source module 12. The destination module 14 may access stored video data from the storage device 31 via streaming or download. The file server may be any type of server capable of storing encoded video data and transmitting that encoded video data to the destination module 14. Example file servers include a web server (e.g., for a website), an FTP server, network attached storage (NAS) devices, or a local disk drive. The destination module 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 31 may be a streaming transmission, a download transmission, or a combination of both.

In the example of FIG. 1A, the source module 12 includes a video source 18, video encoder 20 and an output interface 22. In some cases, the output interface 22 may include a modulator/demodulator (modem) and/or a transmitter. In the source module 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source module 12 and the destination module 14 may form so-called camera phones or video phones, as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted directly to the destination module 14 via the output interface 22 of the source module 12. The encoded video data may also (or alternatively) be stored onto the storage device 31 for later access by the destination module 14 or other devices, for decoding and/or playback.

The destination module 14 includes an input interface 28, a video decoder 30, and a display device 32. In some cases, the input interface 28 may include a receiver and/or a modem. The input interface 28 of the destination module 14 may receive the encoded video data over the link 16. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server.

The display device 32 may be integrated with, or external to, the destination module 14. In some examples, the destination module 14 may include an integrated display device and also be configured to interface with an external display device. In other examples, the destination module 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination modules 12, 14 are on or part of a device or user device 11. The device 11 may be a telephone handset, such as a "smart" phone or the like. The device 11 may include an optional controller/processor module 13 in operative communication with the source and destination modules 12, 14. The system 10' of FIG. 1B may further include a video processing unit 21 between the video encoder 20 and the output interface 22. In some implementations, the video processing unit 21 is a separate unit, as illustrated in FIG. 1B; however, in other implementations, the video processing unit 21 can be implemented as a portion of the video encoder 20 and/or the processor/controller module 13. The system 10' may also include an optional tracker 29, which can track an object of interest in a video sequence. The object or interest to be tracked may be segmented by a technique described in connection with one or more aspects of the present disclosure. In related aspects, the tracking may be performed by the display device 32, alone or in conjunction with the tracker 29. The system 10' of FIG. 1B, and components thereof, are otherwise similar to the system 10 of FIG. 1A, and components thereof.

As described in greater detail below, aspects of this disclosure generally relate to inter-layer reference picture set derivation techniques using indications of certain properties of reference layer pictures to determine a number of active reference layer pictures from a set of direct reference layer pictures. The techniques of this disclosure may be performed by the video encoder 20, the video decoder 30, and/or the processor/controller module 13.

In one example, the video encoder 20 and the video decoder 30 may operate according to video compression standards, including HEVC or the like. In another example, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. Other examples of video compression standards include MPEG-2 and ITU-T H.263. The techniques of this disclosure, however, are not limited to any particular coding standard or technique.

Although not shown in FIGS. 1A-B, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of coding tree units (CTUs), also referred to as largest coding units (LCUs), that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

Figure 2:
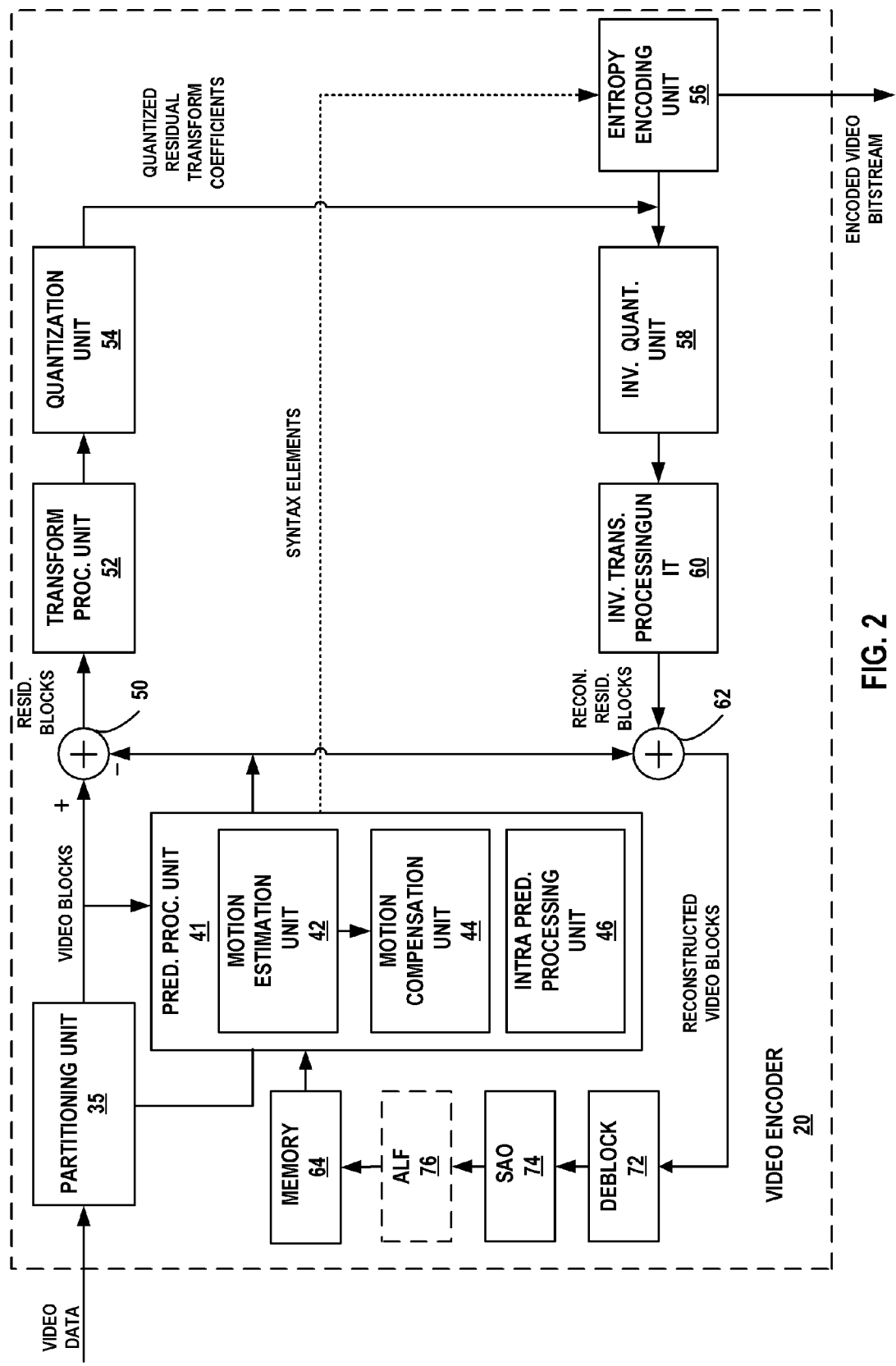
FIG. 2 is a block diagram illustrating an example video encoder that may implement the inter-layer reference picture set derivation techniques described in this disclosure.

FIG. 2 is a block diagram illustrating an example video encoder 20 that may implement the inter-layer reference picture set (RPS) derivation techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, memory 64 (which may also be referred to as reference picture memory 64), summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Deblocking filter 72 may also be included to filter block boundaries to remove blockiness artifacts from reconstructed video. As shown in FIG. 2, video encoder 20 also includes additional loop filters, including sample adaptive offset (SAO) filter 74 and an optional adaptive loop filter (ALF) 76. Although deblocking filter 72 and SAO filter 74, and optional ALF 76 are shown as being in-loop filters in FIG. 2, in some configurations deblocking filter 72, SAO filter 74, and optional ALF 76 may be implemented as post-loop filters. Additionally, one or more of deblocking filter 72 and optional ALF 76 may be omitted in some implementations of the techniques of this disclosure. In particular, ALF 76 would be omitted in implementations for HEVC, since ALF 76 does not exist in HEVC.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, which may include a partition size, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as predicted slices (P slices), bi-direction predicted slices (B slices), or generalized PB slices (GPB slices). Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may perform intra-prediction on a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and prediction processing unit 41 may select an appropriate intra-prediction or inter-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, prediction processing unit 41 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64.

Prior to storage in memory 64, the reconstructed residual block can be filtered by one or more filters. If desired, deblocking filter 72 may also be applied to filter the reconstructed residual blocks in order to remove blockiness artifacts. Other loop filters (either in the coding loop or after the coding loop) may also be used to smooth pixel transitions, or otherwise improve the video quality. One example of such a loop filter is SAO filter 74. The reference block may be used by motion estimation unit 42 and motion compensation unit 44 as a reference block to inter-predict a block in a subsequent video frame or picture.

SAO filter 74 can determine offset values for SAO filtering in a manner that improves video coding quality. Improving video coding quality may, for example, involve determining offset values that make a reconstructed image more closely match an original image. Video encoder 20 may, for example, code the video data using multiple passes with different offset values and choose, for inclusion in an encoded bitstream, the offset values that offer a desirable coding quality, as determined based on a rate-distortion calculation, for example.

In some configurations, SAO filter 74 may be configured to apply one or more types of offset, such as edge offset described above. SAO filter 74 may also at times apply no offset, which can itself be considered a third type of offset. The type of offset applied by SAO filter 74 may be either explicitly or implicitly signaled to a video decoder. When applying edge offset, pixels can be classified based on edge information.

Video encoder 20 of FIG. 2 represents an example of a video encoder configured to determine a first edge index, wherein the first edge index comprises an edge index for a luma component of a first surrounding pixel, determine a second edge index, wherein the second edge index comprises an edge index for a luma component of a second surrounding pixel, determine a third edge index based on the first edge index and the second edge index, wherein the third edge index comprises an edge index for a chroma component of a current pixel, select an offset based on the third edge index, and apply the offset to the chroma component of the current pixel.

Figure 3:
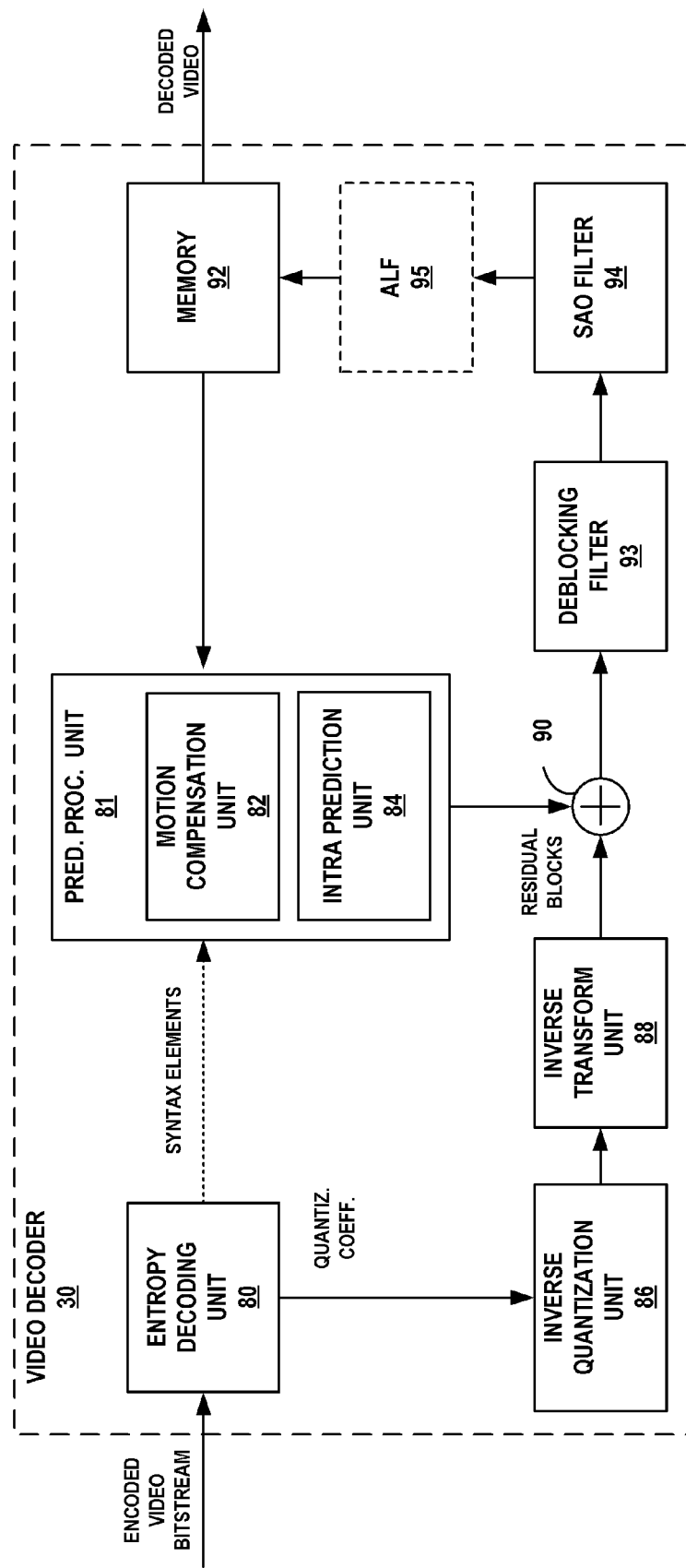
FIG. 3 is a block diagram illustrating an example video decoder that may implement the inter-layer reference picture set derivation techniques described in this disclosure.

FIG. 3 is a block diagram illustrating an example video decoder 30 that may implement the inter-layer reference picture set (RPS) derivation techniques described in this disclosure. In the example of FIG. 3, video decoder 30 includes an entropy decoding unit 80, prediction processing unit 81, inverse quantization unit 86, inverse transformation unit 88, summer 90, and reference picture memory 92. Prediction processing unit 81 includes motion compensation unit 82, for inter-prediction decoding, and intra prediction processing unit 84, for intra-prediction decoding. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit 81 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. The decoded video blocks formed by summer 90 may then be filtered by a deblocking filter 93, SAO filter 94, and optional ALF 95. Optional ALF 95 represents an optional filter that may be excluded from some implementations. It is noted that ALF 95 would be omitted in implementations for HEVC, since ALF 95 does not exist in HEVC. The decoded video blocks in a given frame or picture are then stored in reference picture memory 92, which stores reference pictures used for subsequent motion compensation. Reference picture memory 92 also stores decoded video for later presentation on a display device, such as display device 32 of FIGS. 1A-B. In related aspects, SAO filter 94 can be configured to apply one or more of the same filtering (e.g., edge offset and band offset) as SAO filter 74 discussed above.

Video decoder 30 of FIG. 3 represents an example of a video decoder configured to determine a first edge index, wherein the first edge index comprises an edge index for a luma component of a first surrounding pixel, determine a second edge index, wherein the second edge index comprises an edge index for a luma component of a second surrounding pixel, determine a third edge index based on the first edge index and the second edge index, wherein the third edge index comprises an edge index for a chroma component of a current pixel, select an offset based on the third edge index, and apply the offset to the chroma component of the current pixel.

In accordance with one or more aspects of the present disclosure, there are provided techniques for inter-layer reference picture set (RPS) derivation. The techniques may be performed by a system or, for example, by the device 10 of FIG. 1B. In some implementations, the techniques may be performed by the video encoder 20, the video decoder 30, and/or the processor-controller module 13, alone or in combination. In one aspect, the techniques may involve indicating whether an inter-layer reference picture set includes all direct reference layer pictures that are not restricted for use in inter-layer prediction, as described further in connection with FIGS. 4-5. In another aspect, the techniques may involve determining a number of active reference layer pictures from one or more direct reference layer pictures, as described further in connection with FIGS. 6-7.

Figure 4:
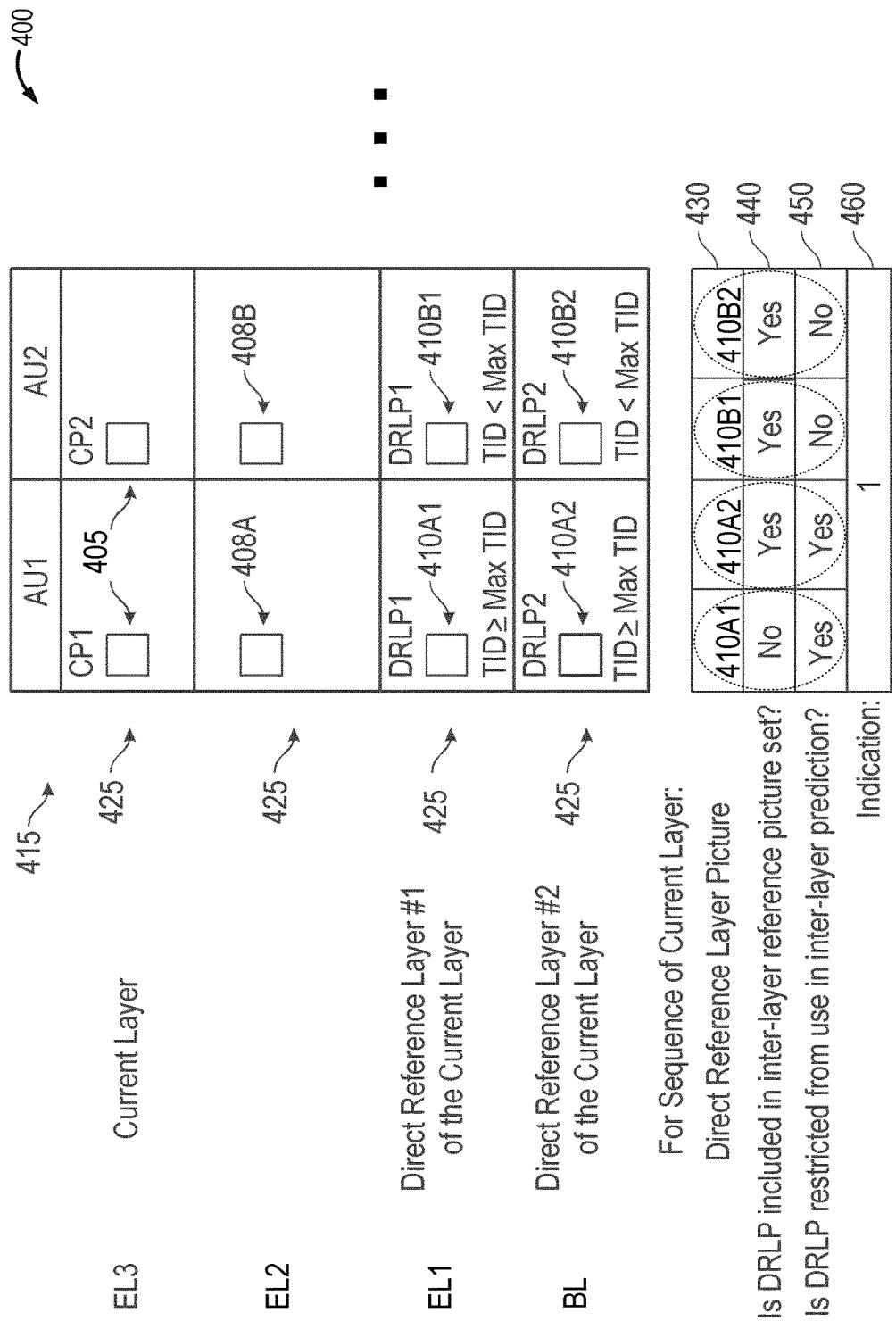
FIG. 4 illustrates an example of video information that may be processed to indicate whether an inter-layer reference picture set includes all direct reference layer pictures that are not restricted for use in inter-layer prediction.

FIG. 4 illustrates an example of video information 400 that may be processed to indicate whether an inter-layer reference picture set includes all direct reference layer pictures (also referred to herein as "reference pictures" or "reference layer pictures") that are not restricted for use in inter-layer prediction. In one aspect, one or more of the features described with respect to FIG. 4 may generally be performed by an encoder (e.g., the video encoder 20 of FIGS. 1A, 1B and/or 2). In one embodiment, the video encoder 20 may provide the indication to a video decoder (e.g., the video decoder 30 of FIGS. 1A, 1B, and/or 3). In another embodiment, the indication may be indicated or determined by a different device. The various aspects described with respect to FIG. 4 may be included in a memory unit (e.g., the storage device 34 of FIG. 1A, the memory 64 of FIG. 2, etc.). The various operations described with respect to FIG. 4 may be performed by a processor (e.g., a processor within the source module, destination module, video encoder and/or video decoder of any one or more of FIGS. 1A-3, the processor/controller module 13 of FIG. 1B, and/or a video processing unit, such as the video processing unit 21 of FIG. 1B, etc.). The video encoder, the video decoder, the memory unit, and/or the processor may be in communication with each other and/or operationally connected.

A video sequence 415 includes access units (collectively referred to as access units 420), where each of the access units 420 may contain one or more pictures. The pictures may be associated with a video parameter set (VPS). The VPS specifies common parameters for all pictures in a video sequence, such as the video sequence 415. The video sequence 415 of FIG. 4 illustrates two access units AU1, AU2; however, the video sequence 415 may include any number of access units 420. Each access unit AU1, AU2 may be associated with one or more layers 425 of video information, as illustrated by a base layer BL and three enhancement layers EL1, EL2, and EL3. The lowest illustrated layer or layer at the very bottom level of the video information 400 may be the base layer (BL) or a reference layer (RL), and the layer at the very top level or at a highest level of the video information 400 may be an enhanced layer. The "enhanced layer" may be considered as being synonymous with an "enhancement layer," and these terms may be used interchangeably. In this example, layer BL is the base layer and layers EL1, EL2, and EL3 are first, second and third enhancement layers, respectively. The layers between the base layer BL and the highest enhancement layer EL3 may serve as enhancement layers and/or reference layers. In this example, layers EL1, EL2 and EL3 represent enhancement layers.

For instance, a given layer (e.g., the second enhancement layer EL2) may be an enhancement layer for a layer below (i.e., that precedes) the given layer, such as the base layer (e.g., base layer BL) or any intervening enhancement layer (e.g., the first enhancement layer EL1). Further, the given layer (e.g., the second enhancement layer EL2) may also serve as a reference layer for an enhancement layer (e.g., the third enhancement layer EL3) above (i.e., subsequent to) the given layer. Any given layer in between the base layer (i.e., the lowest layer having, for example, a layer identification (ID) set or equal to "1") and the top layer (or the highest layer) may be used as a reference for inter-layer prediction by a layer higher relative to the given layer and may be determined using a layer lower to the given layer as a reference for inter-layer prediction.

The layer 425 that is currently being processed may be referred to as the "current layer." In the example illustration, the third enhancement layer EL3 represents the current layer, although it should be understood that any layer 625 may be treated as the current layer and processed according to any of the embodiments described herein. A current layer may be associated with one or more direct reference layers. As mentioned above, a direct reference layer is a layer that may be used for inter-layer prediction of another layer, such as the current layer. In the illustrated example, the first enhancement layer EL1 and the base layer BL represent first and second direct reference layers of the current layer EL3, respectively. The first enhancement layer EL1 and the base layer BL are direct reference layers of the current layer because they are determined to be layers that may be used for inter-prediction of the third enhancement layer, which in this example is the current layer.

Each of the layers 425 may comprise one or more pictures, each picture being associated with one of the layers 425 and one of the access units AU1, AU2. The pictures associated with the current layer (in this example, the third enhancement layer EL3) may be referred to collectively as the current pictures 405. For example, in the illustrated embodiment, the current pictures 405 include a first current picture CP1 located within the first access unit AU1 and a second current picture CP2 located within the second access unit AU2. Pictures (e.g., pictures 410A1, 410A2, 410B1, 410B2) that are in direct reference layers (e.g., the first enhancement layer EL1 and the base layer BL) of the current layer (e.g., the third enhancement layer EL3) may be referred to collectively as direct reference layer pictures 410 (or reference layer pictures 410). For example, the direct reference layer picture 410B1 is the picture in the first direct reference layer (in this example, the first enhancement layer EL1) and the second access unit AU2. This direct reference layer picture 410B1 may also be referred to as "direct reference layer picture 1 of current picture 2." As another example, the direct reference layer picture 410A2 is the picture in the second direct reference layer (in this example, the base layer BL) and the first access unit AU1. This direct reference layer picture 410A1 may also be referred to as "direct reference layer picture 2 of current picture 1." Pictures that are in non-direct reference layers of the current layer (e.g., non-direct reference layer EL2) may be referred to simply as pictures 408. In the illustrated embodiment, pictures 408 include a picture 408A located in the first access unit AU1 and a second picture 408B located in the second access unit AU2. In one embodiment, the processor (e.g., processor 13) may not consider or make any determinations based on the pictures 408A and 408B in non-direct reference layer (e.g., the second enhancement layer EL2).

Each of the direct reference layer pictures 410 may be associated with a respective temporal identification number or value or "TID value" (not shown). In one aspect, each of the pictures in a one of the access units AU1, AU2 may be associated with the same (i.e., a common) TID value. For example, for the first access unit AU1, the current picture CP1, the picture 408A, and both of the direct reference layer pictures 410A1 and 410A2 may be associated with the same TID value. In some aspects, the processor 13 may respectively determine if the associated TID value of each of the direct reference layer pictures 410 is less than a predetermined threshold (e.g., "maximum temporal identification value," "maximum temporal identification number," or "Max TID"). In some embodiments, the Max TID may be associated with the current layer and the video sequence 415. In the illustrated example, the direct reference layer picture 410A1 is associated with a TID value that is greater than or equal to the Max TID, and the direct reference layer picture 410B1 is associated with a TID value that is less than the Max TID. In one embodiment, the Max TID may be a value of "4", the TID value associated with the direct reference layer picture 410A1 (in the first access unit AU1) may be "5", and the TID value associated with the direct reference layer picture 410B1 (in the second access unit AU2) may be "2". In some embodiments, the Max TID may be a constant value for the entire video sequence 415. For example, the Max TID may remain constant for the entire video sequence 415 as per a video encoding standard (e.g., the max_tid_il_ref_pics_plus1[i] variable of the HEVC standard). In other embodiments, the Max TID may vary per access unit AU1, AU2 in the video sequence 415. In other words, each respective access unit 420 may be associated with a respective Max TID.

The processor 13 may determine various information using the properties of each of the direct reference layer pictures 410 and each direct reference layer picture's associated current picture 405. Rows 430, 440, 450 and 460 of FIG. 4 illustrate one embodiment of such information. For example, values in row 430 represent the direct reference layer pictures 410 associated with the access units AU1, AU2. FIG. 4 further illustrates associations (shown as ovals having in broken lines) between each of the direct reference layer pictures 410 (e.g., direct reference layer picture 410A1 associated with the first access unit AU1, direct reference layer picture 410A2 associated with the first access unit AU1, direct reference layer picture 410B1 associated with the second access unit AU2, and direct reference layer picture 410B2 associated with the second access unit AU2) and the corresponding entries in rows 440 and 450, as further described below.

For each access unit of the video sequence 415, a processor 13 may determine if the direct reference layer pictures 410 within the access unit are included in an inter-layer reference picture set for the current picture 405. In one aspect, the inter-layer reference picture set may also include other pictures. For example, regarding the first access unit AU1, a processor may determine whether the first direct reference layer picture 410A1 is included in an inter-layer reference picture set to predict CP1. The processor may also determine whether the second direct reference layer picture 410A2 is included in the inter-layer reference picture set to predict CP1. Regarding the second access unit AU2, the processor may determine whether the first direct reference layer picture 410B1 is included in an inter-layer reference picture set to predict CP2. The processor may also determine whether the second direct reference layer picture 410B2 is included in the inter-layer reference picture set to predict CP2. The results of these example determinations are illustrated in row 440. Such determination may involve determining whether the each of the direct reference layer pictures 410 can be used for inter-layer prediction of an associated one of the current pictures 405. In some embodiments, the processor 13 may make this determination based on a degree of prediction efficiency that may be realized by utilizing the direct reference layer picture 410. For example, if the processor 13 determines that one or more of the direct reference layer pictures 410 comprises a level of similarity (e.g., based on motion estimation, such as, but not limited to a difference in motion estimation between the particular direct reference layer picture and the associated current picture) to an associated one of the current pictures 405 that is greater than a threshold amount, then the processor 13 may determine that it would be efficient (e.g., the processor would utilize less bits in signaling) to use such one or more of the direct reference layer pictures 410 to predict the associated one of the current pictures 405. Thus, the processor 13 may determine whether one or more of the direct reference layer pictures 410 is included in the inter-layer reference picture set.

As illustrated in row 440, only direct reference layer pictures 410A2, 410B1, and 410B2 are included in the inter-layer reference picture set. Alternatively, the processor 13 may determine that one or more of the direct reference layer pictures 410 does not have similarity to the current picture 405 greater than a threshold, such that it would not be efficient to use such one or more direct reference layer pictures 410 to predict the associated one of the current pictures 405. In such case, the processor 13 may determine that such ones of the direct reference layer pictures 410 are not included in the inter-layer reference picture set. For example, as illustrated in row 440, the direct reference layer picture 410A1 is not included in the inter-layer reference picture set. In some embodiments, the processor 13 may perform the above-described determinations for each of the direct reference layer pictures 410, as shown in row 440.

The processor 13 may also determine whether each of the direct reference layer pictures 410 are restricted from use in inter-layer prediction. The results of such determinations are illustrated in row 450. In some embodiments, the processor 13 may analyze only the ones of the direct reference layer pictures 410 that the processor 13 previously determined were not included in the inter-layer reference picture set to determine whether such direct reference layer pictures are restricted from use in inter-layer prediction. For example, as shown in row 440, only the first direct reference layer picture 410A1 of the first access unit AU1 was previously determined not to be included in the inter-layer reference picture set. Therefore, in one embodiment, the processor 13 only analyzes such picture (the first direct reference layer picture 410A1) to determine whether it is restricted from use in inter-layer prediction. In another embodiment, the processor 13 may determine whether each of the direct reference layer pictures 410 are restricted from use in inter-layer prediction, regardless of whether the processor 13 has previously determined whether to include such direct reference layer pictures 410 in the inter-layer reference picture set. In another embodiment, the processor 13 determines whether one or more of the direct reference layer pictures 410 are restricted from use in inter-layer prediction before determining whether such direct reference layer pictures 410 are included in the inter-layer reference picture set. Determining whether each one of the direct reference layer pictures 410 is restricted from use in inter-layer prediction may be based on whether each one of the direct reference layer pictures 410 is associated with a TID value that is greater than or equal to the Max TID. In the illustrated example of FIG. 4, the processor 13 determines that the first direct reference layer picture 410A1 of the first access unit A1 is restricted from use in inter-layer prediction. This determination is represented in row 450 as "Yes". The processor 13 determines that the first direct reference layer picture 410A1 of the first access unit A1 is restricted from use in inter-layer prediction because the direct reference layer picture 410A1 is associated with a TID value greater than or equal to the Max TID (as indicated at the intersection of the first enhancement layer EL1 and the first access unit AU1). In one embodiment, as described above (but not illustrated in FIG. 4), because the remaining direct reference layer pictures 410A2, 410B1 and 410B2 of the video sequence 415 are determined to be included in the inter-layer reference picture set (as indicated in row 440), the processor 13 need not further determine whether such remaining direct reference layer pictures 410A2, 410B1 and 410B2 are restricted from use in inter-layer prediction. Because the processor need not perform such further determinations, the values in row 450 corresponding to such further determination may be indicated as "N/A." However, in the illustrated embodiment, the processor 13 further determines whether each of the remaining direct reference layer pictures 410A2, 410B1, and 410B2 are restricted from use in inter-layer prediction based on whether each of their respective TID values are greater than or equal to the Max TID. The results associated with the remaining direct reference layer pictures 410A2, 410B1, and 410B2, are provided in row 450 as "Yes", "No", and "No", respectively. Because the direct reference layer picture 410A2 is associated with a TID value greater than or equal to the Max TID, the processor 13 determines that the direct reference layer picture 410A2 is restricted from use in inter-layer prediction. Similarly, because the direct reference layer pictures 410B1 and 410B2 are associated with a TID value that is not greater than or equal to the Max TID, the processor 13 determines that the direct reference layer pictures 410B1 and 410B2 are not restricted from use in inter-layer prediction.

The processor 13 may determine whether to set an indication based on whether the direct reference layer pictures are included in an inter-layer reference picture set (as shown in row 440) and whether at least the direct reference layer pictures that are not included in the inter-layer reference picture set (e.g., direct reference layer picture 410A1) are restricted from use in inter-layer prediction (as shown in row 450). The indication set to a value of "1" specifies that for each picture referring to the VPS, the reference layer pictures that belong to all direct reference layers of the layer containing the picture and that are not restricted to be used for inter-layer prediction, are present in the same access unit as the picture, and are included in the inter-layer reference picture set of the picture. The indication set to a value of "0" specifies that the above restriction may or may not apply. The processor 13 may determine whether to set the indication for each of the current pictures 405 (or collectively for the current layer) and/or for a coded video sequence (CVS) (e.g., for all layers within a CVS). In one embodiment, the indication indicates whether all of the direct reference layer pictures 410 that are not restricted for use in inter-layer prediction (in the illustrated embodiment, direct reference layer pictures 410B1 and 410B2, as indicated in row 450) are included in the inter-layer reference picture set (as indicated in row 440). In one embodiment, the processor 13 may set the indication for all of the current pictures 405 in the video sequence 415 using a single indication (e.g., comprising a single bit). For example, the indication may be a flag that the processor 13 sets to a value of "1" or a value of "0". In some embodiments, the flag being set to a value of "1" may indicate that all of the associated direct reference layer pictures 410 that are not restricted for use in inter-layer prediction are included in the inter-layer reference picture set and the flag being set to a value of "0" may indicate that all of the associated direct reference layer pictures 410 that are not restricted for use in inter-layer prediction are not included in the inter-layer reference picture set. In some embodiments, the flag being set to a value of "1" may indicate that all of the associated direct reference layer pictures 410 that are not restricted for use in inter-layer prediction are included in the inter-layer reference picture set and the flag being set to a value of "0" may indicate that at least one of the associated direct reference layer pictures 410 that are not restricted for use in inter-layer prediction is not included in the inter-layer reference picture set. In some embodiments, the values, "0" and "1", of the flag may provide an opposite indication from those described above.

In some embodiments, the flag may be initialized to a value of "0" or "1" before the processor 13 performs any of the above described determinations. In one embodiment, the flag can be an HEVC-related flag, e.g., all_ref_layers_active_flag. In another embodiment, the processor 13 may make this indication in a different way. For example, in an alternative embodiment, the processor 13 may individually provide this indication for each of the current pictures 405 in the video sequence 415.

In the illustrated example of FIG. 4, the direct reference layer pictures 410 of the current pictures 405 are direct reference layer pictures 410A1, 410A2, 410B1, and 410B2 (as indicated in row 430). The direct reference layer pictures 410A2, 410B1, and 410B2 are included in the inter-layer reference picture set (as indicated in row 440). Because at least one of the direct reference layer pictures 410 (in the illustrated embodiment, direct reference layer picture 410A1) is not included in the inter-layer reference picture set, previous methods would determine that an indication should be set to a value of "0". However, according to various embodiments described herein, a processor may instead further determine whether such direct reference layer picture 410A1 is restricted from use in inter-layer prediction. In the illustrated example, as discussed above, because the direct reference layer picture 410A1 has a TID value that is greater than or equal to the Max TID, the processor 13 may determine that the direct reference layer picture 410A1 is restricted from use in inter-layer prediction (as indicated in row 450). Therefore, all of the direct reference layer pictures 410 for the current layer that are not restricted for use in inter-layer prediction are included in the inter-layer reference picture set. Regarding the first current picture CP1 in the first access unit AU1, a processor may determine that the reference layer pictures (e.g., direct reference layer pictures 410A1 and 410A2) that belong to all direct reference layers (e.g., the base layer BL and the first enhancement layer EL1) of the layer (e.g., the current layer, which in this embodiment is the third enhancement layer EL3) containing the picture (e.g., the current picture CP1) and that are not restricted to be used for inter-layer prediction (e.g., there are no such pictures, as indicated in the left two columns of row 450), are present in the same access unit as the picture, and are included in the inter-layer reference picture set of the picture. The processor may set the indication in this embodiment because there are no direct reference layer pictures that are not restricted from use in inter-layer prediction. In addition, with respect to the second current picture CP2 in the second access unit AU2, the processor may also provide the indication (e.g., the indication in row 460) to indicate that the reference layer pictures (e.g., direct reference layer pictures 410B1 and 410B2) that belong to all direct reference layers (e.g., the base layer BL and the first enhancement layer EL1) of the layer (e.g., the current layer, which in this embodiment is the third enhancement layer EL3) containing the picture (e.g., the current picture CP2) and that are not restricted to be used for inter-layer prediction (e.g., as indicated in the right two columns of row 450), are present in the same access unit (e.g., AU2) as the picture (e.g., the current picture CP2), and are included in the inter-layer reference picture set (e.g., as indicated in right two columns of row 440) of the picture (e.g., the second current picture CP2). For example, the processor may set the indication by setting a flag to a value of "1" (as shown in row 460). In other words, the direct reference layer pictures that belong to all direct reference layers of the layer containing the picture and that are not restricted to be used for inter-layer prediction (as determined by comparing associated TID values with a Max TID) are present in the same access unit as the picture and may be included in the inter-layer reference picture set of the picture. In another embodiment, the flag is initialized to a value of "1", and the processor may refrain from changing the flag value when all of the direct reference layer pictures 410 for the current layer that are not restricted for use in inter-layer prediction are included in the inter-layer reference picture set. For example, the processor may instead set the flag to a value of "0" when at least one of the direct reference layer pictures 410 for the current layer that is not restricted for use in inter-layer prediction is not included in the inter-layer reference picture set.

In another embodiment (not depicted in FIG. 4), all else being the same as described above, the processor 13 may have instead determined that the direct reference layer picture 410B2 is not included in the inter-layer reference picture set. In this proposed example, the entry at row 440 associated with the direct reference layer picture 410B2 would instead be populated with a "No". In this embodiment, the processor 13 may then determine whether the direct reference layer picture 410B2 is restricted from use in inter-layer prediction (the result of such determination indicated in the entry at row 450 associated with the direct reference layer picture 410B2). Because the direct reference layer picture 410B2 has a TID value less than the Max TID, the processor 13 may determine that the direct reference layer picture 410B2 is not restricted for use in inter-layer prediction (as indicated in row 450). Thus, not all of the direct reference layer pictures 410 for the current layer that are not restricted for use in inter-layer prediction are included in the inter-layer reference picture set. As a result, the processor 13 may provide indication to indicate that a restriction that for each picture referring to the VPS, the reference layer pictures that belong to all direct reference layers of the layer containing the picture and that are not restricted to be used for inter-layer prediction, are present in the same access unit as the picture, and are included in the inter-layer reference picture set of the picture, may or may not apply. Such indication may include setting a flag to a value of "0". As such, in this proposed example, the entry at row 460 would instead be populated with a "0". In one embodiment, the processor 13 may set the flag to a value of "0" to indicate that the direct reference layer pictures 410 associated with the current pictures 405 may or may not include all of the direct reference layer pictures 410 that are not restricted for use in inter-layer prediction. In another embodiment, the processor may initialize the flag to have a value of "0". In such embodiment, the processor 13 may not modify the flag when not all of the direct reference layer pictures 410 for the current layer 425A that are not restricted for use in inter-layer prediction are included in the inter-layer reference picture set. The processor 13 may use any other number of possible considerations and/or determinations to determine a setting of the indication.

In one alternative embodiment, even if the processor determines that all of the direct reference layer pictures 410 for the current layer that are not restricted for use in inter-layer prediction are included in the inter-layer reference picture set, in some instances, the processor may still set the indication to a value of "0". For example, the processor may set the indication to a value of "0" when the processor determines that more than a predetermined number of the direct reference layer pictures 410 are not included in the inter-layer reference picture set even though they are restricted from use in inter-layer prediction. In one embodiment, the predetermined number may be based on a predetermined threshold (e.g., a percentage), which may vary based on the type of encoding, the picture type, a frames per second value, and/or any other picture parameter. For example, if the number of direct reference layer pictures 410 is 10, the predetermined threshold is 4, and the processor determines that 5 of the 10 direct reference layer pictures 410 are not included in the inter-layer reference picture set, then in one embodiment, the processor may set the indication value to "0".

Having set the indication (as indicated at row 460), the processor 13 may then enable a device (e.g., the video encoder 20) to signal the indication to another device (e.g., the video decoder 30). The video encoder 20 may also signal other indications based on various determinations of the processor 13. For example, the video encoder 20 may signal a number of direct reference layer pictures with respect to a current picture 405 and/or for all of the current pictures 405 in the video sequence 415. In one aspect, the video encoder 20 may signal indications at a slice level. In one aspect, based on one or more of these indications, the video decoder 30 may then determine a number of active reference layer pictures from the direct reference layer pictures such that the video decoder 30 may determine a number of inter-layer reference pictures included in an inter-layer reference picture set (RPS), as further described below with respect to FIG. 6.

In the context of the current HEVC extension methods described above, in one embodiment, the techniques described with respect to FIG. 4 may be used to modify certain HEVC semantics so as to enable a video encoder to set the all_ref_layers_active_flag to 1 even when pictures of some sub-layers are not used for inter-layer prediction. In one embodiment, this feature may be enabled if, for each picture not belonging to those sub-layers, the reference layer pictures of all direct reference layers of the layer containing the picture are present in the same access unit as the picture and are included in the inter-layer reference picture set of the picture. For example, a new semantics definition of the all_ref_layers_active_flag may include: "all_ref_layers_active_flag equal to 1 specifies that for each picture referring to the VPS, the reference layer pictures that belong to all direct reference layers of the layer containing the picture and that are not restricted to be used for inter-layer prediction, as determined by the values of max_tid_il_ref_pics_plus1[i], are present in the same access unit as the picture, and are included in the inter-layer reference picture set of the picture. all_ref_layers_active_flag equal to 0 specifies that the above restriction may or may not apply."

In an alternative embodiment, the above described flag may be set to 0 in certain circumstances when the Max TID is 0. Example additional language for this definition may include "When max_tid_il_ref_pics_plus1[i] is equal to 0 for any value of i in the range of 0 to vps_max_layers_minus1, inclusive, the value of all_ref_layers_active_flag shall be equal to 0."

In another alternative embodiment, the processor 13 may signal the above described reference layer flag (e.g., all_ref_layers_active_flag) in an earlier position than any existing flag that may indicate the presence of a Max TID (e.g., max_tid_ref_present_flag). In such embodiment, when the reference layer flag is set (e.g., equal to 1), the Max TID presence flag may not be set (e.g., equal to 0).

In another alternative embodiment, any existing flag that may indicate a presence of a Max TID (e.g., max_tid_ref_present_flag) may not be present (e.g., or removed from the syntax in the context of the HEVC extension methods described above). Additionally, the processor 13 may signal the above described reference layer flag (e.g., all_ref_layers_active_flag) in an earlier position than a variable representing a Max TID value (e.g., max_tid_il_ref_pics_plus1[i]). In such embodiment, when the reference layer flag is set (e.g., equal to 1), the variable representing the Max TID value may not be present. One example implementation of this alternative embodiment is shown in syntax Table 1 below:

TABLE 1

| | Descriptor |
|---|---|
| vps_extension( ) { | |
| ... | |
| all_ref_layers_active_flag | u(1) |
| if( all_ref_layers_active_flag ) | |
| for( i = 0; i < vps_max_layers_minus1; i++ ) | |
| max_tid_il_ref_pics_plus1[ i ] | u(3) |
| ... | |
| } | |

In another embodiment, the processor 13 may signal the above described reference layer flag (e.g., all_ref_layers_active_flag) in an earlier position than any existing flag that may indicate the presence of a Max TID (e.g., max_tid_ref_present_flag) and earlier than a variable representing a Max TID value (e.g., max_tid_il_ref_pics_plus1[i]). In such embodiment, when the reference layer flag is set (e.g., equal to 1) and the Max TID variable is present, the Max TID variable value may be 7. In other words, the Max TID variable value may be equal to a VPS max sub layer variable (e.g., vps_max_sub_layers_minus1+1).

Figure 5:
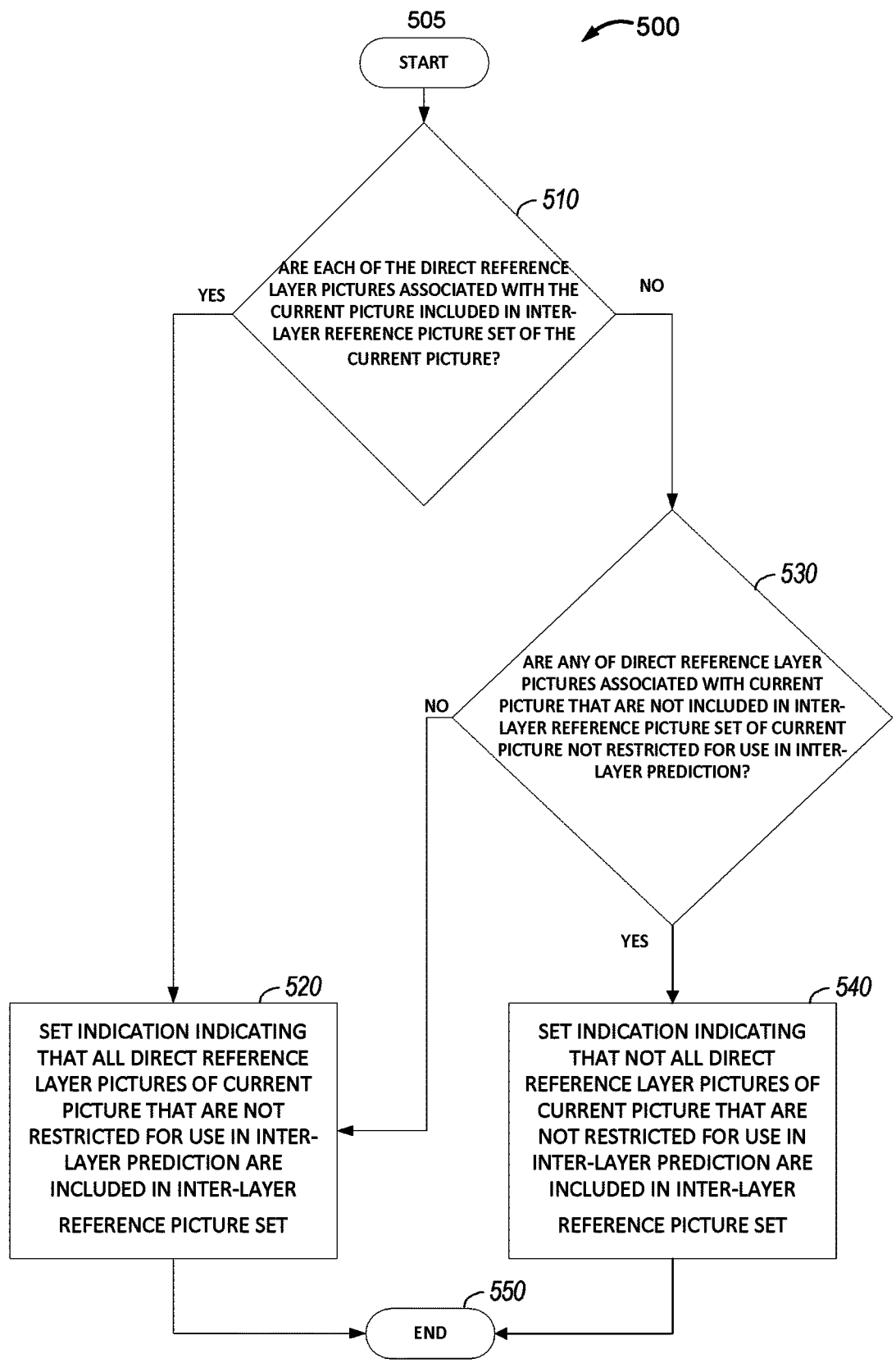
FIG. 5 illustrates a flowchart of one method for a processor of a video encoder to indicate whether an inter-layer reference picture set includes all of the direct reference layer pictures that are not restricted for use in inter-layer prediction.

FIG. 5 illustrates a flowchart of one method for a processor (e.g., the processor 13) of a video encoder (e.g., the video encoder 20) to indicate whether an inter-layer reference picture set includes all of the direct reference layer pictures that are not restricted for use in inter-layer prediction, as described in connection with FIG. 4.

The method 500 starts at block 505. At block 510, the processor 13 may determine whether each of the direct reference layer pictures (e.g., the direct reference layer pictures 410A1, 410A2 of FIG. 4) associated with a first current picture (e.g., the first current picture CP1 of FIG. 4) are included in an inter-layer reference picture set of the first current picture CP1. The method can be repeated for each of the pictures in the video sequence. The processor 13 may perform this determination using any of the methods described above. In some embodiments, the processor 13 may make this determination in another way.

The processor 13 may determine (at block 510) that each of the direct reference layer pictures associated with the current picture are included in the inter-layer reference picture set of the current picture. In such case, at block 520 the processor may set an indication indicating that all of the direct reference layer pictures for the current layer that are not restricted for use in inter-layer prediction are included in the inter-layer reference picture set of the current picture. In one aspect, this may correspond to each of the values in row 440 of FIG. 4 being "Yes," regardless of the values in row 450 of FIG. 4. Setting the indication in block 520 may therefore correspond to the methods described with respect to setting a flag to a value of "1", as indicated in row 460 of FIG. 4.

The processor 13 may instead determine (at block 510) that not each of the direct reference layer pictures associated with the current picture are included in the inter-layer reference picture set of the current picture. For example, as illustrated in FIG. 4, the direct reference layer picture 410A1 is not included in the inter-layer reference picture set. In such case, at block 530, the processor may determine whether any of the direct reference layer pictures associated with the current picture that are not included in the inter-layer reference picture set of the current picture are not restricted for use in inter-layer prediction. For example, the processor 13 may make this determination with respect to the direct reference layer picture 410A1 using the methods described with respect to row 450 of FIG. 4. In some aspects, the processor 13 may make this determination in another way, as further described in connection with FIG. 4.

The processor may determine (at block 530), that none of the direct reference layer pictures associated with the current picture that are not included in the inter-layer reference picture set of the current picture 405 are not restricted for use in inter-layer prediction (or that all of the direct reference layer pictures associated with the current picture that are not included in the inter-layer reference picture set of the current picture are restricted for use in inter-layer prediction). In such case, at block 520 the processor may set an indication indicating that all of the direct reference layer pictures for the current layer that are not restricted for use in inter-layer prediction are included in the inter-layer reference picture set of the current picture, as discussed above.

Alternatively, the processor may instead determine (at block 530), that at least one of the direct reference layer pictures associated with the current picture that are not included in the inter-layer reference picture set of the current picture 405 are not restricted for use in inter-layer prediction. In this case, then at block 540, the processor may set an indication indicating that not all of the direct reference layer pictures for the current layer that are not restricted for use in inter-layer prediction are included in the inter-layer reference picture set. In one aspect, this may correspond to the methods described with respect to setting a flag to a value of "0" as described in connection with FIG. 4. As discussed above, in some embodiments flag values may be initialized to an initialization value. In such case, the processor may not set the flag value if the value to be set to is equal to the initialized value.

The method ends at block 550. As described above in connection with FIG. 4, the above process is only one example of how the processor 13 may determine the indication.

Figure 6:
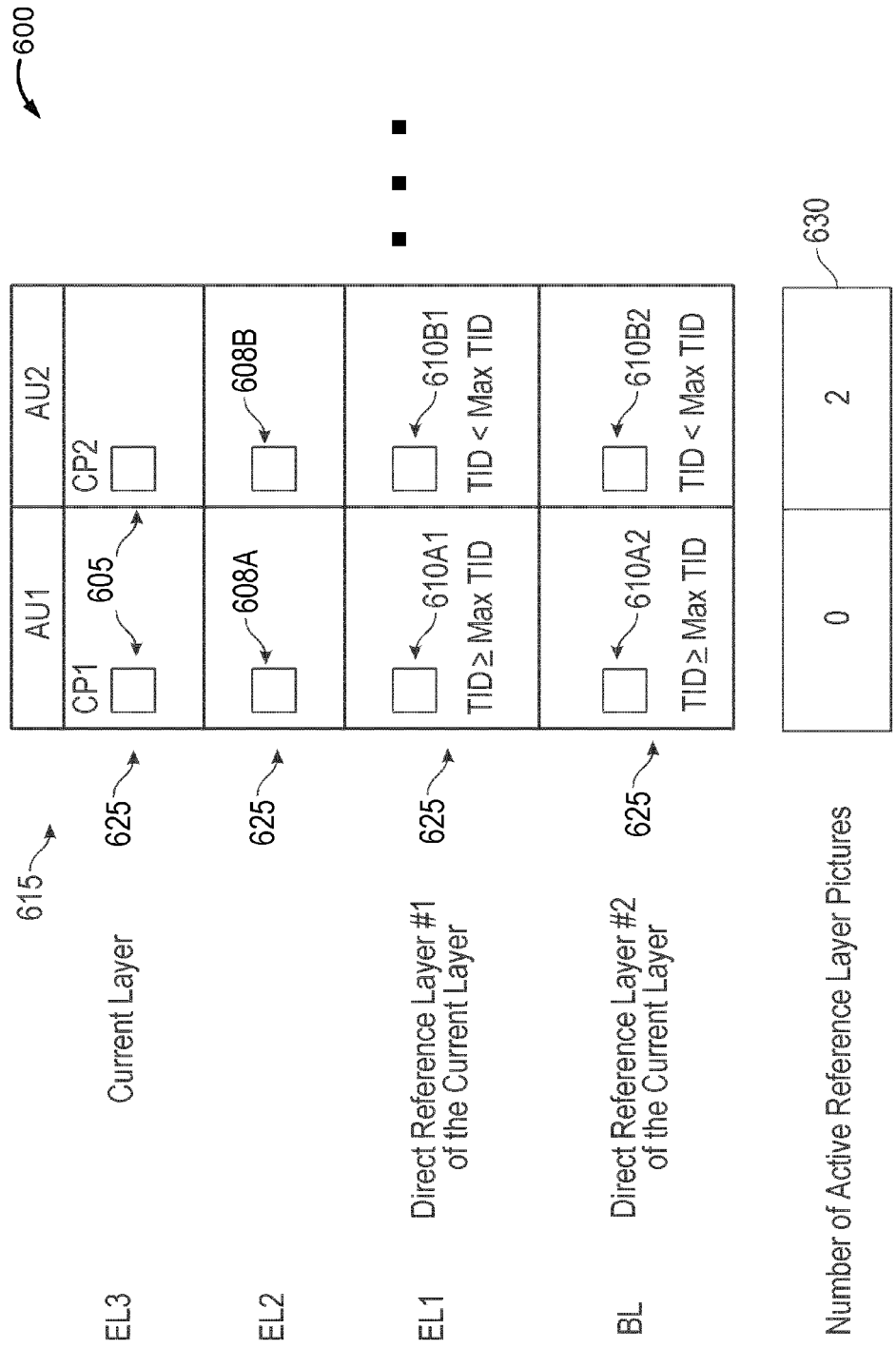
FIG. 6 illustrates an example of video information that may be processed to determine a number of active reference layer pictures from one or more direct reference layer pictures.

FIG. 6 illustrates an example of video information 600 that may be processed to determine a number of active reference layer pictures from one or more direct reference layer pictures (also referred to herein as "direct reference pictures," "reference pictures," or "reference layer pictures"). Active reference layer pictures are pictures in reference layers that are currently being processed using inter-layer prediction. The active reference layer pictures correspond to the particular direct reference layer pictures that are used to decode the current picture. In one embodiment, a reference picture set only contains active reference layer pictures. Therefore, in one embodiment, the terms "active reference picture set" and "reference picture set" may be used interchangeably. In one aspect, one or more of the features described with respect to FIG. 6 may generally be performed by a decoder (e.g., the video decoder 30 of FIGS. 1A, 1B, and/or 3). In one aspect, the video decoder 30 may receive various indications from an encoder (e.g., the video encoder 20 of FIGS. 1A, 1B, and/or 2). In another embodiment, the indications may be received from a different device or may be stored in a memory unit (e.g., the storage device 34 of FIG. 1A, the memory 92 of FIG. 3, etc.). Other embodiments described with respect to FIG. 6 may also be included in the memory unit. The operations described with respect to FIG. 6 may be performed by a processor (e.g., a processor within the source module, destination module, video encoder, and/or video decoder of any one or more of FIGS. 1A-3, the processor/controller module 13 of FIG. 1B, and/or a video processing unit, such as the video processing unit 21 of FIG. 1B, etc.). The video decoder, video encoder, memory unit, and/or the processor may be in communication with each other and/or operationally connected.

In one embodiment, before determining a number (e.g., a quantity) of active reference layer pictures from the one or more direct reference layer pictures, the video decoder 30 may first determine whether all of the one or more direct reference layer pictures that are not restricted for use in inter-layer prediction are included in an inter-layer reference picture set associated with a current picture. In one aspect, the inter-layer reference picture set may comprise all or a portion of the inter-layer reference picture set described in connection with FIGS. 4-5. In one aspect, the inter-layer reference picture set may also include other pictures. In one embodiment, the video decoder 30 may determine whether all of the one or more direct reference layer pictures that are not restricted for use in inter-layer prediction are included in an inter-layer reference picture set associated with a current picture based on an indication. For example, the indication may be set and stored and/or provided to the video decoder 30 by the video encoder 20. In such example, the indication may comprise the indication described with respect to row 460 of FIG. 4. In one example, the indication may be a flag set to "1." In other embodiments, the video decoder 30 may make this determination in other ways. As described with respect to FIG. 4, the video decoder 30 may also receive the one or more direct reference layer pictures from the video encoder 20 or from some other source.

A video sequence 615 includes access units (collectively referred to as access units 620), where each of the access units 620 may contain one or more pictures. The video sequence 615 of FIG. 6 illustrates two access units AU1, AU2; however, the video sequence 615 may include any number of access units 620. Each access unit AU1, AU2 may be associated with one or more layers 625 of video information, as illustrated by a base layer BL and three enhancement layers EL1, EL2, and EL3. The lowest illustrated layer or layer at the very bottom of the video information 600 may be the base layer (BL) or a reference layer (RL), and the layer at the very top level or at a highest level of the video information 600 may be an enhanced layer. The "enhanced layer" may be considered as being synonymous with an "enhancement layer," and these terms may be used interchangeably. In this example, layer BL is the base layer, and layers EL1, EL2, and EL3 are first, second, and third enhancement layers, respectively. The layers between the base layer BL and the highest enhancement layer EL3 may serve as enhancement layers and/or reference layers. In this example, layers EL1, EL2, and EL3 represent enhancement layers.

For example, a given layer (e.g., the second enhancement layer EL2) may be an enhancement layer for a layer below (i.e., that precedes) the given layer, such as the base layer (e.g., base layer BL) or any intervening enhancement layer (e.g., the first enhancement layer EL1). Further, the given layer (e.g., the second enhancement layer EL2) may also serve as a reference layer for an enhancement layer (e.g., the third enhancement layer EL3) above (i.e., subsequent to) the given layer. Any given layer in between the base layer (i.e., the lowest layer having, for example, a layer identification (ID) set or equal to "1") and the top layer (or the highest layer) may be used as a reference for inter-layer prediction by a layer higher relative to the given layer and may be determined using a layer lower to the given layer as a reference for inter-layer prediction.

The layer 625 that is currently being processed may be referred to as the "current layer." In the example illustration, the third enhancement layer EL3 represents the current layer. A current layer may be associated with one or more direct reference layers. As mentioned above, a direct reference layer is a layer that may be used for inter-layer prediction of another layer, such as the current layer. In the illustrated example, the first enhancement layer EL1 and the base layer BL represent first and second direct reference layers of the current layer (e.g., which in the illustrated embodiment is the third enhancement layer EL3), respectively. The first enhancement layer EL1 and the base layer BL are direct reference layers of the current layer because they are determined to be layers that may be used for inter-prediction of the third enhancement layer, which in this example is the current layer.

Each of the layers 625 may comprise one or more pictures, each picture being associated with one of the layers 625 and one of the access units AU1, AU2. The pictures associated with the current layer (in this example, the third enhancement layer EL3) may be referred to collectively as the current pictures 605. For example, in the illustrated embodiment, the current pictures 605 include a first current picture CP1 located within the first access unit AU1 and a second current picture CP2 located within the second access unit AU2. Pictures (e.g., pictures 610A1, 610A2, 610B1, 610B2) that are in direct reference layers (e.g., the first enhancement layer EL1 and the base layer BL) of the current layer (e.g., the third enhancement layer EL3) may be referred to collectively as direct reference layer pictures 610 (or reference layer pictures 610). For example, the direct reference layer picture 610B1 is the picture in the first direct reference layer (in this example, the first enhancement layer EL1) and the second access unit AU2. This direct reference layer picture 610B1 may also be referred to as "direct reference layer picture 1 of current picture 2." As another example, the direct reference layer picture 610A2 is the picture in the second direct reference layer (in this example, the base layer BL) and the first access unit AU1. This direct reference layer picture 610A1 may also be referred to as "direct reference layer picture 2 of current picture 1." Pictures that are in non-direct reference layers of the current layer (e.g., non-direct reference layer EL2) may be referred to simply as pictures 608. In the illustrated embodiment, pictures 608 include a picture 608A located in the first access unit AU1 and a second picture 608B located in the second access unit AU2. In one embodiment, the processor (e.g., processor 13) may not consider or make any determinations based on the pictures 608A and 608B in non-direct reference layer (e.g., the second enhancement layer EL2).

Each of the direct reference layer pictures 610 may be associated with a respective temporal identification number or value or "TID value" (not shown). In one aspect, each of the pictures in one of the access units AU1, AU2 may be associated with the same (i.e., a common) TID value. For example, for the first access unit AU1, the current picture CP1, the picture 608A, and both of the direct reference layer pictures 610A1 and 610A2 may be associated with the same TID value. In some aspects, the processor 13 may respectively determine if the associated TID value of each of the direct reference layer pictures 610 is less than a predetermined threshold (e.g., "maximum temporal identification value," "maximum temporal identification number," or "Max TID"). In some embodiments, the Max TID may be associated with the current layer and the video sequence 615. In the illustrated example, the direct reference layer picture 610A1 is associated with a TID value that is greater than or equal to the Max TID, and the direct reference layer picture 610B1 is associated with a TID value that is less than the Max TID. In one embodiment, the Max TID may be a value of "4", the TID value associated with the direct reference layer picture 610A1 (in the first access unit AU1) may be "5", and the TID value associated with the direct reference layer picture 610B1 (in the second access unit AU2) may be "2". In such case, the direct reference layer picture 610A1 would not be determined to be an active reference layer picture of the current picture because the TID value associated with the direct reference layer picture 610A1 is greater than or equal to the Max TID. However, in such case, the direct reference layer picture 610B1 would be determined to be an active reference layer picture of the current picture because the TID value associated with the direct reference layer picture 610B1 is not greater than or equal to the Max TID. In some embodiments, the Max TID may be a constant value for the entire video sequence 615. For example, the Max TID may remain constant for the entire video sequence 615 as per a video encoding standard (e.g., the max_tid_il_ref_pics_plus1[i] variable of the HEVC standard). In other embodiments, the Max TID may vary per access unit AU1, AU2 in the video sequence 615. In other words, each respective access unit AU1, AU2 may be associated with a respective Max TID.

The processor 13 may determine various information using the properties of each of the direct reference layer pictures 610 and each direct reference layer picture's associated current picture 605. Row 630 of FIG. 6 illustrates one embodiment of such information. For example, values in row 630 represent the number of active reference layer pictures from the one or more direct reference layer pictures 610 in each of the access units AU1, AU2.

As described above, for each access unit of the video sequence 615, a processor 13 may determine a number of active reference layer pictures from the one or more direct reference layer pictures 610. For example, regarding the first access unit AU1, a processor 13 may determine a number of active reference layer pictures from the first access unit's current picture's direct reference layer pictures 610A1 and 610A2. In one embodiment, the processor 13 may determine the number of active reference layer pictures to be equal to a number of the direct reference layer pictures 610 that are associated with a TID value less than the Max TID. Regarding the access unit AU1, both of the direct reference layer pictures 610A1 and 610A2 are associated with a TID value that is greater than or equal to the Max TID. Thus, the processor 13 may not count either of the direct reference layer pictures 610A1 or 610A2 as active reference layer pictures. Thus, in the illustrated embodiment for access unit AU1, the processor 13 may determine that the number of active reference layer pictures from the one or more direct reference layer pictures 610 is equal to "0", as shown in the portion of row 630 corresponding to the first access unit AU1.

Regarding the second access unit AU2, the processor 13 may similarly determine a number of active reference layer pictures from the second access unit's current picture's direct reference layer pictures 610B1 and 610B2. As described above, in one embodiment, the processor 13 may determine the number of active reference layer pictures to be equal to a number of the direct reference layer pictures 610 that are associated with a TID value less than the Max TID. Regarding the access unit AU2, both of the direct reference layer pictures 610B1 and 610B2 are associated with a TID value that is less than the Max TID. Thus, the processor 13 may count both of the direct reference layer pictures 610B1 and 610B2 as active reference layer pictures. Thus, in the illustrated embodiment for access unit AU2, the processor 13 may determine that the number of active reference layer pictures from the one or more direct reference layer pictures 610 is equal to "2", as shown in the portion of row 630 corresponding to the second access unit AU2.

The processor 13 may use any other number of possible considerations and/or determinations to determine the number of active reference layer pictures. In one alternative embodiment, the processor 13 may determine which of the direct reference layer pictures 610 are not active reference layer pictures (e.g., by determining a number of the direct reference layer pictures 610 that are associated with a TID value greater than or equal to the Max TID) and then determine a number of active reference layer pictures based on a difference value.

Having determined the number of active reference layer pictures (as indicated at row 630), the processor 13 may then indicate such determination as a variable value as per a video decoding standard (e.g., the NumActiveRefLayerPics variable of the HEVC standard). In one embodiment, the processor 13 may define an inter-layer reference picture set (RPS) (e.g., an "active reference picture set" or a "reference picture set") such that it contains the associated active reference layer pictures. The processor 13 may then decode the associated current picture 605 using inter-layer prediction based on at least one of the active reference layer pictures. For example, based on the above described analysis, the processor 13 may decode the current picture 605 in AU2 using inter-layer prediction based on one or more of the active reference layer pictures 610B1 and/or 610B2.

In the context of the current HEVC extension methods described above, in one embodiment, certain HEVC Standard variable definitions may also be modified to take advantage of the semantics modifications as described in connection with FIG. 4. For example, certain variable definition modifications may allow the video decoder 30 to selectively count pictures during derivation of certain variables (e.g., NumActiveRefLayerPics). That is, reference layer pictures that belong to sub layers which are not used for inter-layer prediction (e.g., as indicated by a Max TID, which could be the variable max_tid_il_ref_pics_plus1 described above) may not be included in the inter-layer reference picture set. For example, new code for deriving NumActiveRefLayerPics may include the following:

```
if( nuh_layer_id = = 0 || NumDirectRefLayers[ nuh_layer_id ] = = 0 )
    NumActiveRefLayerPics = 0;
else if( all_ref_layers_active_flag )
    for( i = 0, NumActiveRefLayerPics = 0; i < NumDirectRefLayers[
nuh_layer_id ]; i++ ) {
        layerIdx = LayerIdxInVps[ RefLayerId[ nuh_layer_id ][ i ] ]
        if( max_tid_il_ref_pics_plus1[ layerIdx ] > TemporalId )
            NumActiveRefLayerPics++
    };
else if( !inter_layer_pred_enabled_flag )
    NumActiveRefLayerPics = 0;
else if( max_one_active_ref_layer_flag || NumDirectRefLayers[
nuh_layer_id ] = = 1 )
    NumActiveRefLayerPics = 1;
else
    NumActiveRefLayerPics = num_inter_layer_ref_pics_minus1 + 1;
```

As described above in connection with FIG. 4, the semantics modifications and methods described in the present disclosure may cause the all_ref_layers_active_flag to be set to 1 more frequently than in current HEVC extensions methods. Therefore, the above new code for deriving NumActiveRefLayerPics may cause the first 'else if' in the code block to be utilized more frequently (e.g., because the all_ref_layers_active_flag is set to 1 more frequently) than in current HEVC extensions methods. In one embodiment, the parameters of the first 'else if' in the code block may represent a portion of the methods described in connection with FIGS. 6-7.

Figure 7:
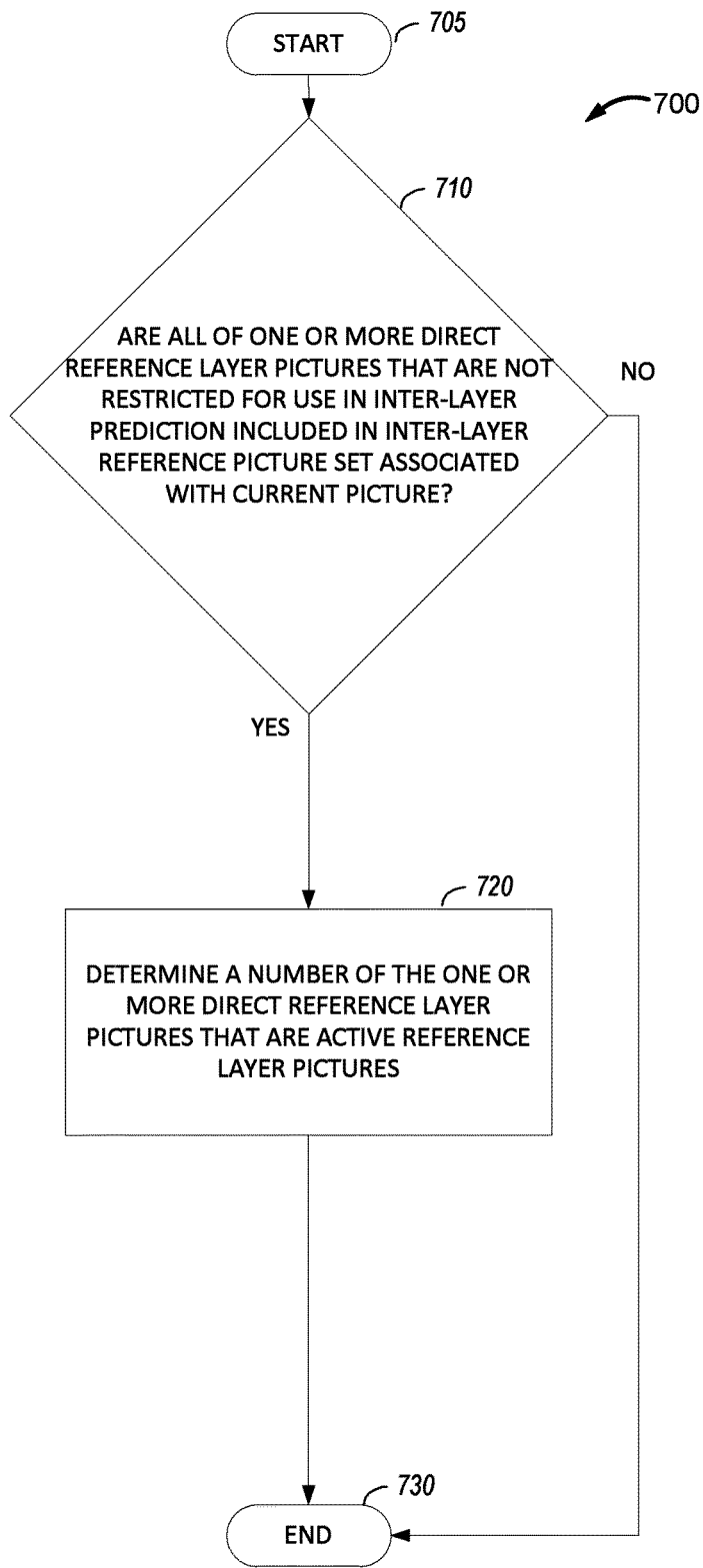
FIG. 7 illustrates a flowchart of one method for a processor of a video decoder to determine a number of active reference layer pictures from one or more direct reference layer pictures.

FIG. 7 illustrates a flowchart of one method for a processor (e.g., the processor 13) of a video decoder (e.g., the video decoder 30) to determine a number of active reference layer pictures from one or more direct reference layer pictures as described in connection with FIG. 6.

The method 700 starts at block 705. At block 710, the processor 13 may determine whether all of one or more direct reference layer pictures that are not restricted for use in inter-layer prediction are included in an inter-layer reference picture set associated with a current picture. In one aspect, the inter-layer reference picture set may comprise all or a portion of the inter-layer reference picture set described in connection with FIGS. 4-5. For example, the inter-layer reference picture set may comprise each of the direct reference layer pictures 610A1, 610A2, 610B1, and 610B2 of FIG. 6. In one embodiment, the processor 13 may determine whether all of the one or more direct reference layer pictures that are not restricted for use in inter-layer prediction are included in an inter-layer reference picture set associated with a current picture based on an indication provided by a video encoder (e.g., the video encoder 20), as further described in connection with FIGS. 4-6. In other embodiments, the processor 13 may make the determination using any of the methods described above. In some embodiments, the processor 13 may make the determination in another way.

The processor 13 may determine (at block 710) that all of the one or more direct reference layer pictures that are not restricted for use in inter-layer prediction are included in the inter-layer reference picture set associated with the current picture. In one example, the processor 13 may make such determination based on receiving a flag set to "1" as described in connection with FIG. 6. In such case, at block 720 the processor 13 may determine a number of the one or more direct reference layer pictures that are active reference layer pictures. In one embodiment, the number of the one or more direct reference layer pictures that are active reference layer pictures may be equal to a number of the direct reference layer pictures that are associated with a TID value less than a Max TID. The TID value and the Max TID may be the TID value and the Max TID as described in connection with FIG. 6. In one embodiment, the processor 13 may make the determination described in connection with block 720 for each access unit. For example, referring to AU1 of FIG. 6, the processor 13 may determine a number of the direct reference layer pictures 610A1 and 610A2 that are associated with a TID value less than the Max TID and then separately determine a number of the direct reference layer pictures 610B1 and 610B2 that are associated with a TID value less than the Max TID. As described above, such determination may also be described as determining a number of active reference layer pictures from one or more direct reference layer pictures. For example, such determination may correspond to the determinations described with respect to row 630 of FIG. 6. The method may then end at block 730. As described above in connection with FIG. 6, the above process is only one example of how the processor 13 may make such determination.

The processor 13 may instead determine (at block 710) that not all of the one or more direct reference layer pictures that are not restricted for use in inter-layer prediction are included in the inter-layer reference picture set associated with the current picture. In one example, the processor 13 may make such determination based on receiving a flag set to "0" as described in connection with FIG. 6. In such case, the method may then end at block 730. As described above in connection with FIG. 6, the above process is only one example of how the processor 13 may make such determination.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. A video encoder comprising:
  a memory unit configured to store one or more direct reference layer pictures of a current picture, wherein the current picture is associated with a current layer[j], the current layer[j] being associated with one or more direct reference layers; and
  a processor in communication with the memory unit and configured to:
    determine whether all of the one or more direct reference layer pictures belonging to the one or more direct reference layers associated with the current layer[j] that are not restricted for use such that the one or more direct reference layer pictures belonging to the one or more direct reference layers associated with the current layer[j] are available for use in inter-layer prediction, as determined based on a direct reference layer picture of each direct reference layer[i] of the one or more direct reference layers having a temporal identification value less than a respective value of a variable max_tid_ref_pics_plus1[i][j] associated with each combination of the current layer[j] with each direct reference layer[i] of the one or more direct reference layers, are present in a same access unit as the current picture and are included in an inter-layer picture set associated with the current picture; and
    set a default_ref_layers_active_flag associated with the current picture to a first value based on a determination that all of the one or more direct reference layer pictures belonging to the one or more direct reference layers associated with the current layer[j] that are available for use in inter-layer prediction, as determined based on a direct reference layer picture of each direct reference layer[i] of the one or more direct reference layers having a temporal identification value less than a respective value of the variable max_tid_il_ref_pics_plus1[i][j] associated with each combination of the current layer[j] with each direct reference layer[i] of the one or more direct reference layers, are present in a same access unit as the current picture and are included in the inter-layer reference picture set associated with the current picture.

2. The video encoder of claim 1, wherein the processor is further configured to determine, based on the default_ref_layers_active_flag being set to the first value, that for each respective picture referring to a video parameter set (VPS), any reference layer picture that belongs to any direct reference layer associated with a layer containing the respective picture that is available for use inter-layer prediction is included in an inter-layer reference picture set of the respective picture.

3. The video encoder of claim 1, wherein the processor is further configured to:
  set the default_ref_layers_active_flag to a second value based on a determination that at least one of the one or more direct reference layer pictures belonging to the one or more direct reference layers associated with the current layer[j] of the current picture that is available for use in inter-layer prediction, as determined based on a direct reference layer picture of each direct reference layer[i] of the one or more direct reference layers having a temporal identification value less than a value of the respective variable max_tid_ref_pics_plus1[i][j] associated with each combination of the current layer[j] with each direct reference layer[i] of the one or more direct reference layers, is at least one of: (a) not present in the same access unit as the current picture or (b) not included in the inter-layer reference picture set associated with the current picture.

4. A method of encoding video, the method comprising:
  storing one or more direct reference layer pictures of a current picture, wherein the current picture is associated with a current layer[j], the current layer[j] being associated with one or more direct reference layers;
  determining whether all of the one or more direct reference layer pictures belonging to the one or more direct reference layers associated with the current layer[j] that are not restricted for use such that the one or more direct reference layer pictures belonging to the one or more direct reference layers associated with the current layer[j] are available for use in inter-layer prediction, as determined based on a direct reference layer picture of each direct reference layer[i] of the one or more direct reference layers having a temporal identification value less than a respective value of a variable max_tid_ref_pics_plus1[i][j] associated with each combination of the current layer[j] with each direct reference layer[i] of the one or more direct reference layers, are present in a same access unit as the current picture and are included in an inter-layer picture set associated with the current picture; and
  setting a default_ref_layers_active_flag associated with the current picture to a first value based on a determination that all of the one or more direct reference layer pictures belonging to the one or more direct reference layers associated with the current layer[j] that are available for use in inter-layer prediction, as determined based on a direct reference layer picture of each direct reference layer[i] of the one or more direct reference layers having a temporal identification value less than a respective value of the variable max_tid_ref_pics_plus1[i][j] associated with each combination of the current layer[j] with each direct reference layer[i] of the one or more direct reference layers, are present in a same access unit as the current picture and are included in the inter-layer reference picture set associated with the current picture.

5. The method of claim 4, further comprising determining, based on the default_ref_layers_active_flag being set to the first value, that for each respective picture referring to a video parameter set (VPS), any reference layer picture that belongs to any direct reference layer associated with a layer containing the respective picture that is available for use inter-layer prediction is included in an inter-layer reference picture set of the respective picture.

6. The method of claim 4, further comprising:
setting the default_ref_layers_active_flag to a second value based on a determination that at least one of the direct reference layer pictures of the current picture that is available for use in inter-layer prediction, as determined based a direct reference layer picture of each direct reference layer[i] of the one or more direct reference layers having a temporal identification value less than at least a value of the respective variable max_tid_ref_pics_plus1[i][j] associated with each combination of the current layer[j] with each direct reference layer[i] of the one or more direct reference layers, is at least one of: (a) not present in the same access unit as the current picture or (b) not included in the inter-layer reference picture set associated with the current picture.

7. A video decoder, comprising:
a memory unit configured to store one or more direct reference layer pictures of a current picture associated with a current layer[j], wherein each of the one or more direct reference layer pictures is associated with a respective direct reference layer of one or more direct reference layers associated with the a current layer[j]; and
a processor in communication with the memory and configured to:
determine, based on a default_ref_layers_active_flag associated with the current picture having a first value, whether all of the one or more direct reference layer pictures belonging to the one or more direct reference layers associated with the a current layer[j] that are not restricted for use such that the one or more direct reference layer pictures belonging to the one or more direct reference layers associated with the current layer[j] are available for use in inter-layer prediction, as determined based a direct reference layer picture of each direct reference layer[i] of the one or more direct reference layers having a temporal identification value less than a respective value of a variable max_tid_ref_pics_plus1[i][j], are present in a same access unit as the current picture and are included in an inter-layer reference picture set associated with the current picture.

8. The video decoder of claim 7, wherein the processor is further configured to determine a number of the one or more direct reference layer pictures that are active reference layer pictures in response to determining that all of the one or more direct reference layer pictures that are available for use in inter-layer prediction are included in the inter-layer reference picture set associated with the current picture.

9. The video decoder of claim 8, wherein the processor is further configured to decode the current picture using inter-layer prediction and at least one of the direct reference layer pictures.

10. A method for decoding video, the method comprising:
storing one or more direct reference layer pictures of a current picture associate with a current layer[j], wherein each of the one or more direct reference layer pictures is associated with a respective direct reference layer of one or more direct reference layers associated with the current layer[j]; and
determining, based on a default_ref_layers_active_flag associated with the current picture having a first value, whether all of the one or more direct reference layer pictures belonging to the one or more direct reference layers associated with the current layer[j] that are not restricted for use such that the one or more direct reference layer pictures belonging to the one or more direct reference layers associated with the current layer [j] are available for use in inter-layer prediction, as determined based on a direct reference layer picture of each direct reference layer[i] of the one or more direct reference layers having a temporal identification value less than a respective value of a variable max_tid_ref_pics_plus1[i][j], are present in a same access unit as the current picture and are included in an inter-layer reference picture set associated with the current picture.

11. The method of claim 10, further comprising determining a number of the one or more direct reference layer pictures that are active reference layer pictures in response to determining that all of the one or more direct reference layer pictures that are available for use in inter-layer prediction are included in the inter-layer reference picture set associated with the current picture.

12. The method of claim 11, further comprising decoding the current picture using inter-layer prediction and at least one of the direct reference layer pictures.

* * * * *